United States Patent
Raghavan et al.

(10) Patent No.: US 9,171,065 B2
(45) Date of Patent: Oct. 27, 2015

(54) MECHANISMS FOR SEARCHING ENTERPRISE DATA GRAPHS

(71) Applicant: Oracle International Corporation, Redwood Shores, CA (US)

(72) Inventors: Nikhil Raghavan, San Francisco, CA (US); Ravi Murthy, Saratoga, CA (US); Aman Naimat, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 20 days.

(21) Appl. No.: 14/222,521

(22) Filed: Mar. 21, 2014

(65) Prior Publication Data

US 2014/0207802 A1    Jul. 24, 2014

Related U.S. Application Data

(63) Continuation of application No. 13/398,794, filed on Feb. 16, 2012, now Pat. No. 8,682,932.

(51) Int. Cl.
*G06F 7/00* (2006.01)
*G06F 17/30* (2006.01)

(52) U.S. Cl.
CPC .... *G06F 17/30651* (2013.01); *G06F 17/30112* (2013.01); *G06F 17/30958* (2013.01)

(58) Field of Classification Search
CPC .................................................. G06F 17/3023
See application file for complete search history.

(56) References Cited

U.S. PATENT DOCUMENTS

| | | |
|---|---|---|
| 4,068,300 A | 1/1978 | Bachman |
| 5,611,035 A | 3/1997 | Hall |
| 5,724,576 A | 3/1998 | Letourneau |
| 5,787,432 A | 7/1998 | Letourneau |
| 5,818,435 A | 10/1998 | Kozuka et al. |
| 5,917,488 A | 6/1999 | Anderson et al. |
| 6,381,601 B1 | 4/2002 | Fujiwara et al. |
| 7,437,358 B2 | 10/2008 | Arrouye et al. |
| 7,650,343 B2 | 1/2010 | Fellenberg et al. |
| 8,307,016 B2 | 11/2012 | Szyperski et al. |
| 8,356,045 B2 | 1/2013 | Chang et al. |

(Continued)

OTHER PUBLICATIONS

Page, L. et al, "The PageRank citation ranking: Bringing order to the web". Stanford Digital Libraries Working Paper, 1998, 17 pages.

(Continued)

*Primary Examiner* — Ajith Jacob
(74) *Attorney, Agent, or Firm* — Hickman Palermo Becker Bingham LLP; Marcel K. Bingham

(57) ABSTRACT

Highly relevant search results for unstructured queries are efficiently identified from normalized data. A server graphs relationships between each of the data objects. For each search term, the server identifies a candidate set of data objects mapped to the term. The server calculates priority scores for the candidate data objects based at least in part on one or more of: a link analysis of the graph; or an analysis of metadata describing structural constraints upon the candidate data objects. Based on the graph, the server identifies one or more search result subgraphs, each comprising at least one data object from each of the candidate sets. The server looks for subgraphs in an order that is based on the priority scores for the candidate data objects. The server may terminate its search early, in part because prioritizing the candidate data objects increases the likelihood of receiving relevant search results first.

24 Claims, 6 Drawing Sheets

(56) References Cited

U.S. PATENT DOCUMENTS

| | | |
|---|---|---|
| 2001/0032204 A1 | 10/2001 | Hoashi et al. |
| 2003/0028520 A1* | 2/2003 | Alpha .............................. 707/2 |
| 2003/0200034 A1 | 10/2003 | Fellenberg et al. |
| 2004/0054662 A1 | 3/2004 | Dworkis et al. |
| 2005/0154725 A1 | 7/2005 | Day et al. |
| 2005/0220351 A1 | 10/2005 | Vanderwende et al. |
| 2005/0289109 A1 | 12/2005 | Arrouye et al. |
| 2006/0036581 A1 | 2/2006 | Chakrabarti et al. |
| 2006/0101017 A1 | 5/2006 | Eder |
| 2006/0116994 A1 | 6/2006 | Jonker et al. |
| 2006/0161535 A1 | 7/2006 | Holbrook |
| 2007/0266007 A1 | 11/2007 | Arrouye et al. |
| 2008/0010268 A1* | 1/2008 | Liao et al. ......................... 707/5 |
| 2010/0299356 A1 | 11/2010 | Sedlar et al. |
| 2011/0106819 A1 | 5/2011 | Brown et al. |
| 2011/0184932 A1 | 7/2011 | Hennum et al. |
| 2012/0215785 A1 | 8/2012 | Singh et al. |
| 2013/0055065 A1 | 2/2013 | Blas et al. |
| 2013/0218898 A1 | 8/2013 | Raghavan et al. |
| 2013/0218899 A1 | 8/2013 | Raghavan et al. |

OTHER PUBLICATIONS

He, H. et al., "Blinks: Ranked Keyword Searches on Graphs" SIGMOD'07, Jun. 11-14, 2007, Beijing, China, 12 pages.

Aditya, B. et al., "Banks: Browsing and Keyword Searching in Relational Databases" Proceedings of the 28th VLDB Conference, Hong Kong, China, 2002, 4 pages.

* cited by examiner

MECHANISMS FOR SEARCHING ENTERPRISE DATA GRAPHS

CROSS-REFERENCE TO RELATED APPLICATIONS; BENEFIT CLAIM

This application is a Continuation of U.S. patent application Ser. No. 13/398,794, filed Feb. 16, 2012, the entire content of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

This application is related to U.S. patent application Ser. No. 13/398,792, filed Feb. 16, 2012, entitled "MECHANISMS FOR METADATA SEARCH IN ENTERPRISE APPLICATIONS," by Raghavan et al. (hereinafter "Metadata Application"); and U.S. patent application Ser. No. 13/398,799, now U.S. Pat. No. 8,484,208, issued Jun. 9, 2013, entitled "DISPLAYING RESULTS OF KEYWORD SEARCH OVER ENTERPRISE DATA," by Raghavan et al. (hereinafter "Search Result Display Application"), the entire contents of each of which are hereby incorporated by reference for all purposes as if fully set forth herein.

TECHNICAL FIELD

Embodiments relate generally to data search, and, more specifically, to techniques for enhancing search results for unstructured queries on normalized data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Structured Data

The data within databases, document repositories, and other data sources are often structured in accordance with a common underlying format. The common underlying format is typically well-understood by general-purpose data access components such as database servers or extended markup language (XML) parsers. Examples of such formats include, without limitation, relational tables, hierarchical trees, and XML.

For many of these underlying formats, conforming structures may be characterized abstractly as sets of hierarchical nodes. For example, in XML and other hierarchical mark-up languages, nodes are delimited by a pair of corresponding start and end tags, which not only delimit the node, but also specify the name of the node. For example, in the following structured data fragment, <A><B>5</B><D>10</D></A>, the start tag <A> and the end tag </A> delimit a node having name A. The data between the corresponding tags is referred to as the node's content. A node's content can either be a scalar value (e.g. integer, text string), or one or more other nodes. A node that contains only a scalar value is referred to herein as a scalar node. A node that contains another node is referred to herein as a structured node. The contained nodes are referred to herein as descendant nodes. In addition to containing one or more nodes, a structured node's content may also include a scalar value. Such content in a node is referred to herein as mixed content.

A structured node thus forms a hierarchy of nodes with multiple levels, the structured node being at the top level. A node at each level is linked to one or more nodes at a different level. Each node at a level below the top level is a child node of a parent node at the level above the child node. Nodes having the same parent are sibling nodes. A parent node may have multiple child nodes. A node that has no parent node linked to it is a root node, and a node that has no child nodes linked to it is a leaf node. For example, in structured node A, node A is the root node at the top level. Nodes B and D are descendant and child nodes of A, and with respect to each other, nodes B and D are sibling nodes. Nodes B and D are also leaf nodes.

In some embodiments, relational tables may be representative of node-based structures. For example, a node may be represented by rows in one or more tables that share a same unique identifier or key. Attributes may be represented by the values for various fields of those rows. Links may be represented by object-identifying values in other columns of those rows. Various other representations may also be used.

Metadata

Structured data may further be organized in accordance with schemas and/or other information that define structural and content constraints for the structured data, beyond those constraints inherent in the underlying structure of that data. Even within the same data source, different structural and content constraints may apply to data objects, such as nodes, that have the same abstract structures. For example, each row of data in a relational database is already subject to constraints inherent to all relational databases. Yet, rows within one table of a database may further conform to schema-dictated constraints for data used to represent customers, while rows within another table in the same database may instead further conform to schema-dictated constraints for data used to represent purchase orders.

The term metadata is used herein to refer to any information, including schemas, that defines structures and/or constraints for structured data. Metadata may comprise one or more units, of varying complexity and granularity, which are hereinafter referred to as items of metadata, or "metadata items." Metadata items may comprise, reference, or embed, other metadata items. Each metadata item may be described as a "node," and each metadata item may be mapped to one or more specific data objects for which it defines constraints. This disclosure may at times refer to a set of metadata items as a "collection of metadata," "metadata collection," or simply "metadata."

Metadata serves, in one aspect, as a blueprint of how data objects are to be constructed. There are many practical applications of metadata, including without limitation the validation of data input and the optimization of processes such as data parsing, data encoding, and data compression. In an embodiment, metadata may comprise a set of formulas, sentences, rules, objects, or other elements expressed in a formalized language, which in turn specify integrity constraints imposed upon one or more data sources.

Metadata may be created explicitly in a variety of manners, including importations of comprehensive top-down schemas by dedicated data architects, or piecemeal input from end-users providing decentralized bottom-up definitions of individual metadata items. Metadata may further be "discovered" through analyses processes that utilize pattern matching, machine learning, and/or other techniques to classify data objects. The metadata that describes a given structured data object may be identified using a variety of mechanisms, including explicit mappings in the form of markup language or type identifiers internal to the data objects, explicit mappings in external tables that map data objects to metadata by references, and mappings determined using structure recognition processes.

One example of metadata is enterprise application metadata, such as may be used for an extended markup language (XML) application platform. Enterprise application metadata may be used to describe a model for a variety of types of data, including XML and database objects, as discussed in the following paragraphs. In an embodiment, the enterprise application metadata model comprises metadata items that are collectively defined by at least three constructs: elements, types, and states. Elements provide a name and semantic meaning to a data item, whereas types and states provide data validation rules. However, in other embodiments the metadata model may comprise additional or fewer constructs. In an embodiment, enterprise application metadata is stored in representative form within a database system. For example, enterprise application metadata may be represented by tables (or objects), columns (or fields), and relationships between tables and columns (or links).

Another example of metadata is an XML schema. An XML schema is a description of a type of XML document. In an embodiment, an XML schema is expressed in terms of constraints on the structure and content of documents of that type, above and beyond the basic syntactical constraints imposed by XML itself. These constraints are generally expressed using some combination of grammatical rules governing the order of elements, Boolean predicates that the content must satisfy, data types governing the content of elements and attributes, and more specialized rules such as uniqueness and referential integrity constraints. In an embodiment, an XML Schema is itself comprised of a variety of inter-related metadata items, including element type declarations, attribute declarations, entity declarations, notation declarations. An XML schema may be expressed in an XML schema language. Specific examples of an XML schema language include, without limitation, Document Type Definition (DTD), XML Schema (as defined by XML Schema, Part 0, Part 1, Part 2, W3C Recommendation, 2 May 2001; XML Schema Part 1: Structures, Second Edition, W3C Recommendation 28 Oct. 2004; XML Schema 1.1 Part 2: Datatypes, W3C Working Draft 17 Feb. 2006; and XML Schema Part 2: Datatypes Second Edition, W3C Recommendation 28 Oct. 2004, the entire contents of each of which are incorporated herein by reference for all purposes), and RELAX NG.

A database schema is yet another example of metadata. A database schema may comprise metadata items that describe any or all of tables, fields, relationships, views, indexes, packages, procedures, functions, queues, triggers, types, sequences, materialized views, synonyms, database links, directories, and so forth. The database schema may be stored in, for example, a data dictionary within the database. Other types of metadata are also within the scope of this disclosure, including, without limitation, Java object models and other object-based frameworks.

It is at times desirable to locate specific items of metadata, for any of a variety of reasons. To this end, in an embodiment, specific items of metadata may be located using keyword searches on item names and/or descriptions. For example, a data administrator may need to identify the structure of a database, or even reorganize the database. Or, a data administrator may wish to re-use pre-existing metadata items or link to existing data objects when developing the structure of a new data repository.

In an embodiment, metadata is developed in a decentralized manner by a number of end-users forming a community. For example, a community of scientists or doctors may subscribe and/or maintain shared metadata and/or data repositories that are accessible via a variety of applications at any number of locations. In such communities, many diverse end-users may create many types of data objects. Other end-users may wish to locate, use, or even build on top of metadata items already defined by the community. An example of decentralized metadata is described in U.S. application Ser. No. 13/221,832, entitled "Validating XML Documents Based on Decentralized Schemas," and filed Aug. 31, 2011, the entire contents of which are herein incorporated by reference for all purposes.

Normalized Data

Data in large data repositories, including enterprise application data, is often normalized to various degrees. Normalization involves dividing large data objects with many components into smaller (and less redundant) data objects with fewer components. The smaller data objects have relationships defined between them from which the larger data objects may be reconstructed. One objective of data normalization is to isolate data so that additions, deletions, and modifications of a field can be made in just one location, with the effect propagated through the rest of the data repository via the defined relationships. Another objective of normalization is to reduce redundancy by having a single, self-contained data object for each unit of data that is re-useable, such as addresses, names, and components thereof.

For example, the following XML-based data object for purchase orders includes address information that is redundant.

```
<orders>
    <order id="1">
        <customer>John Doe</customer>
        <product>Brand X Tablet Computer</product>
        <shipping_address>
            <street>123 Main St</street>
            <city>Santa Clara</city>
            <zip>95050</zip>
        </shipping_address>
    </order>
    <order id="2">
        <customer>John Doe</customer>
        <product>Brand Y Binoculars</product>
        <shipping_address>
            <street>123 Main St</street>
            <city>Santa Clara</city>
            <zip>95050</zip>
        </shipping_address>
    </order>
    ...
</orders>
```

Regardless of whether this representation reflects how a company may wish to view its data, storage of the data in this manner would be less than desirable for a number of reasons. One way to normalize this data would be to divide the above data object into multiple referential objects such as set forth below:

```
<orders>
    <order id="1" />
    <order id="2" />
    ...
</orders>
<order id="1">
    <customer id="100" />
    <product id="201"/>
</order>
```

-continued

```
<order id="2">
    <customer id="100" />
    <product id="412"/>
</order>
<customer id="100">
    <name> John Doe</name>
    <shipping_address id="1011" />
</customer>
<product id="201">
    <name> Brand X Tablet Computer</name>
</product>
<product id="412">
    <name> Brand Y Binoculars </name>
</product>
< address id="1011">
    <street>123 Main St</street>
    <city>Santa Clara</city>
    <zip>95050</zip>
</ address>
```

The original view of the orders data object is easily reconstructed from the normalized version. Other techniques for normalizing this data may also exist, with varying degrees of normalization.

Various standards exist for data normalization, including without limitation Third Normal Form, which was originally defined in Codd, E. F. "Further Normalization of the Data Base Relational Model". (Presented at Courant Computer Science Symposia Series 6, "Data Base Systems", New York City, May 24-25, 1971.) IBM Research Report RJ909 (Aug. 31, 1971), Republished in Randall J. Rustin (ed.), Data Base Systems: Courant Computer Science Symposia Series 6. Prentice-Hall, 1972, the entire contents of which are herein incorporated by reference for all purposes. Use of the term "normalized data" is not necessarily limited to any particular standard for normalization.

Unstructured Search on Normalized Data

Common search techniques for normalized data rely upon structured queries. Structured queries, such as queries in formal query languages like Structured Query Language (SQL), require that the querying user be aware of both the structure of a data repository and a syntax for referencing the different structural elements. As such, structured queries are often not useful for end-users.

Unstructured search techniques involve queries comprising little more than a set of search terms, without requiring any indication of the structures that should actually be searched for those terms. Many unstructured query techniques rely upon locating data objects that match multiple, if not all, search parameters. For example, in the context of web search, the most highly relevant search results are typically web pages that contain multiple search terms. If, for instance, the un-normalized "order" objects above were individual web pages, the order object with an id of "1" would be considered to be a highly relevant search result for the keyword-based query: "John Tablet 95050."

Unstructured search techniques are problematic in the context of normalized data. For instance, the same query "John Tablet 95050," considered conjunctively, would fail to produce a single data object in the normalized XML from above, as there is no object that contains all three of the terms "John," "Tablet," and "95050." One approach to this problem would be to disjunctively return each data object that matched any term in the search. However, such an approach fails to provide information about the relationships between data objects, and further produces a large number of highly irrelevant results.

For example, a disjunctive query "John Tablet 95050" on normalized data would potentially yield many customer, address, and product objects that match "John," "Tablet," or "95050," without actually returning any order object.

Another category of approaches for searching normalized data involve reconstructing (or "flattening") large data objects by joining the relations of the normalized data objects, and then performing a search on the reconstructed data objects. Some examples of such techniques include candidate-network based solutions such as DISCOVER and DBXplorer. Such techniques require clear constraints on which types of data objects are to be reconstructed and/or a large amount of memory to reconstruct all of the possible data objects. Otherwise, not only may computing resources be exhausted reconstructing each and every possible data object within a repository, but the results themselves may contain many data objects that are not particularly interesting. For example, in the context of the above normalized XML, searching reconstructed data objects for "John Tablet 95050" may be useful if the domain of the search is restricted only to "order" objects. However, without some kind of domain restriction, the "orders," "product," "customer," and "address" objects will also need to be individually reconstructed and searched. Moreover, the "orders" object would also be returned as a search result, which would be less useful for the user because the user would then have to wade through each order inside of the orders object to find if there is a relevant order. Unfortunately, it is challenging to impose useful domain restrictions on object reconstruction without schema awareness on the part of the searcher or pre-defined limitations on the field of search.

Another category of approaches for searching normalized data involves graph-based techniques such as BANKS, BLINKS, or DBPF. Graph-based techniques do not require schema awareness. However, while graph-based techniques have been applied to clearly defined and limited data repositories, the techniques suffer from various performance problems with larger and/or changing data repositories. Example graph-based techniques are described, for instance, in "BANKS: Browsing and Keyword Searching in Relational Databases," Aditya et al., Proceedings of the 28th VLDB Conference, Hong Kong, China, 2002; and "BLINKS: Ranked Keyword Searches on Graphs," He et al., SIGMOD'07, Jun. 11-14, 2007, Beijing, China. The entire contents of each of these documents are hereby incorporated by reference for all purposes as if set forth herein.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
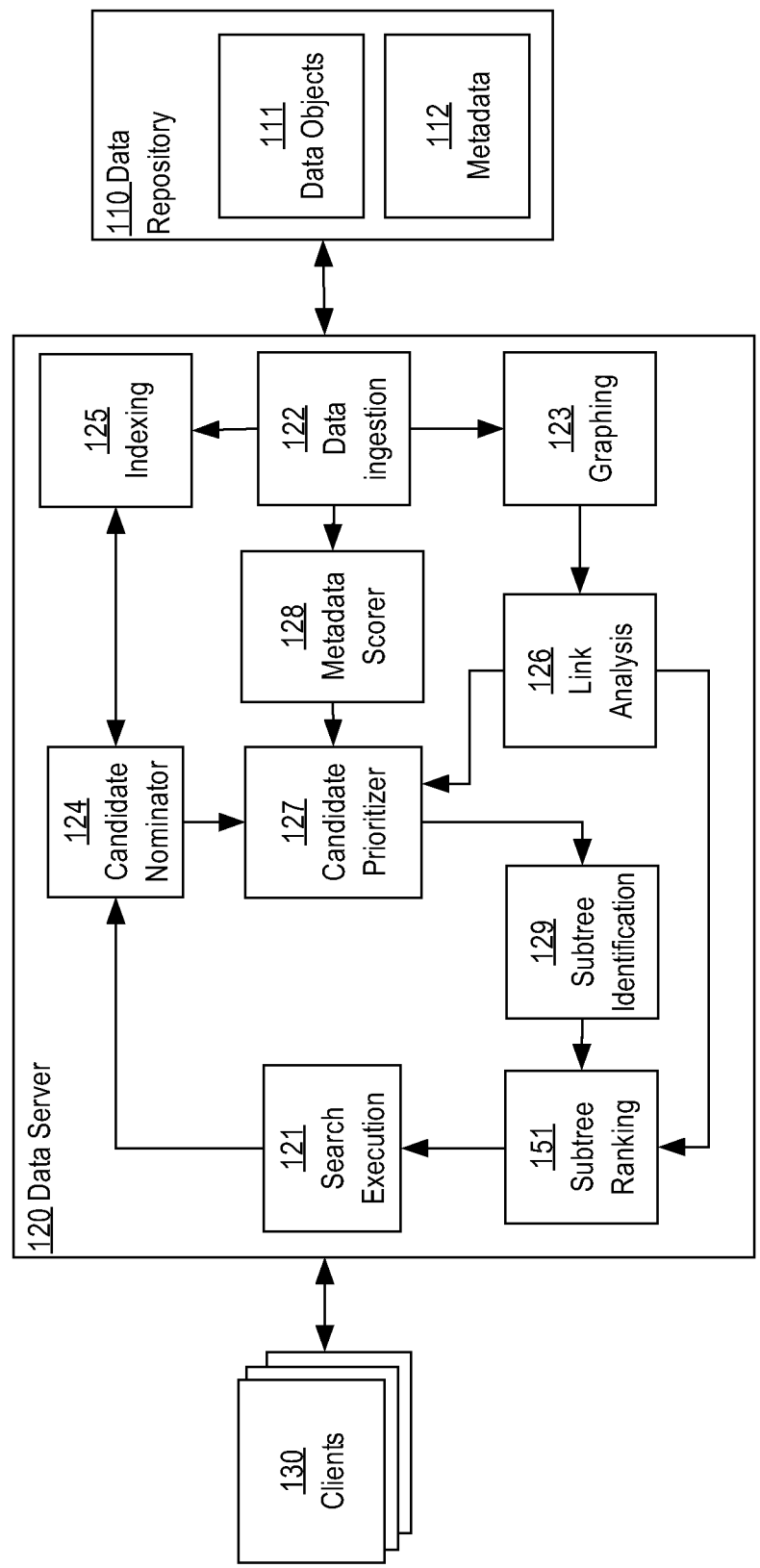
FIG. 1 is a block diagram that illustrates an overview of one embodiment of a system in which the techniques described herein may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
3.0. Functional Overview
   3.1. Search Request
   3.2. Data Ingestion
   3.3. Indexing
   3.4. Graphing
   3.5. Identifying Candidate Nodes
   3.6. Intersecting Disjunctive Candidate Node Vectors
   3.7. Link Analysis Scoring of Candidate Nodes
   3.8. Metadata-Based Scoring of Candidate Nodes
   3.9. Prioritizing/Pruning Candidate Nodes
   3.10. Locating Search Result Subgraphs
   3.11. Termination Events/Constraints
   3.12. Ranking Search Result Subgraphs
   3.13. Returning the Result Set
   3.14. Variations
4.0. Implementation Example
   4.1. Example Search Result Subgraph Identification Flow
   4.2. Walk-Through for Example Technique
   4.3. Example Data Object Graph
   4.4. Example Metadata Graph
   4.5. Example Search Interface
   4.6. Example MetaData and Data
5.0. Implementation Mechanism—Hardware Overview
6.0. Extensions and Alternatives

1.0. General Overview

Approaches, techniques, and mechanisms are disclosed for efficiently identifying highly relevant search results for unstructured queries from normalized data. Each highly-relevant search result is a different subgraph (i.e. subtree) of a graph-based model of the normalized data. The search result subgraph is said to "match" a query on account of its nodes collectively including each term of the query. Highly relevant subgraphs are returned from a traversal of the graph in a relatively short amount of time, without having necessarily discovered all possible subgraphs that match the query. That is to say, the described techniques increase the likelihood that the most highly relevant results are discovered ahead of lesser relevant results, thus allowing highly-relevant results to be returned before the graph-based search is complete. When the results are returned, the graph-based search may be terminated early or continued in the background, depending on the embodiment.

In embodiments, identification of search result subgraphs that match a multi-term query involves locating candidate nodes that match individual terms of the query and traversing the graph upwards from those nodes in search of a common ancestor whose branches include each of the query terms. In such embodiments, the likelihood of relevance for earlier-returned results may be increased by prioritizing the order in which the candidate nodes are considered, in accordance with one or more candidate priority scores. For example, the candidate priority scores may be produced by a link-based analysis of a graph for the data repository or an evaluation of relationships defined in metadata associated with the candidate nodes. Candidate nodes may in fact be altogether ignored based on the candidate priority scores. In an embodiment, the likelihood of relevance for earlier-returned results is increased by imposing constraints on the sizes of subgraphs that may be returned as search results. In an embodiment, the returned results are further ranked by, among other factors, a link analysis.

In an embodiment, a server generates an index mapping data objects to terms associated with the data objects. The server generates a graph describing relationships between each of the data objects. The server receives a search request comprising a plurality of search terms. Based on the index, for each particular term in the plurality of search terms, the server identifies a candidate set of data objects that are mapped to the particular term. The server calculates priority scores for the data objects in the candidate sets based at least in part on one or more of: a link analysis of the graph; or metadata describing structural constraints upon the data objects. Based on the graph, the server identifies one or more search result subgraphs, each comprising at least one data object from each of the candidate sets. Identifying the one or more search result subgraphs comprises looking for subgraphs in an order that is based on the priority scores. The server provides information indicating the one or more search result subgraphs in response to the search request.

In an embodiment, the server terminates identifying the one or more search result subgraphs upon one or more of: comparing a count of the identified one or more search result subgraphs with a maximum result set size; or determining that all search result subgraphs of a maximum depth have been identified. Terminating identifying the one or more search result subgraphs occurs prior to examining the entire graph for search result subgraphs.

In an embodiment, the data objects are normalized and the search request is unstructured. Each data object is one of: a document, a row of a table, or a markup language element.

In an embodiment, the priority scores are based on the link analysis of the graph. The priority score for each particular data object is based at least in part on how many of the data objects depend upon the particular data object. In an embodiment, the graph comprises nodes and edges, the nodes corresponding to data objects and the edges corresponding to the relationships. At least some of the edges have different weights corresponding to different types of relationships that are represented by the edges. In an embodiment, the weights of the edges are based on popularity data indicating how often each type of relationship is involved in at least a certain type of query.

In an embodiment, the server revises the search terms prior to locating the candidate sets, based on or more of a spelling correction engine, an auto-complete engine, or a query reformulation engine.

In an embodiment, the priority scores are based on the metadata. The server generates a metadata graph describing relationships between each metadata item of the metadata. The server performs a link analysis of the metadata graph to calculate relationship scores for the metadata items. The server calculates the priority score for each particular data object based in part on the relationship score of a particular metadata item corresponding to the particular data object.

In an embodiment, identifying the one or more search result subgraphs comprises expanding each data object in each candidate set until a common ancestor is found. Looking for subgraphs in an order that is based on the priority scores comprises selecting an order in which to expand the data objects based on the priority scores.

In an embodiment, the server further ranks the one or more search result subgraphs based on a combination of node weights and edge weights. The information returned in response to the search request is a set of flattened data objects based upon the one or more search result subgraphs.

In an embodiment, calculating priority scores for the data objects in the candidate sets is based on both a link analysis of the graph, and metadata describing structural constraints upon the data objects. The link analysis is performed asynchronous to the search request, for example, as part of a periodic background process and/or in response to changes to the data objects. The metadata is also scored asynchronous to the search request.

In other aspects, the invention encompasses computer apparatuses and a computer-readable media configured to carry out the foregoing steps.

2.0. Structural Overview

FIG. 1 is a block diagram that illustrates an overview of one embodiment of a system 100 in which the techniques described herein may be implemented, according to an embodiment. System 100 comprises a data server 120 that is coupled to a data repository 110 and multiple clients 130 via one or more networks 140. System 100 is but one example of a system in which the techniques described herein may be practiced. Other systems for practicing the techniques described herein may include fewer or additional components, in varying arrangements.

Data repository 110 includes data objects 111 and metadata 112. Data repository 110 may comprise any type(s) of data source(s), including without limitation a relational database, an XML document collection, a multidimensional database, flat files, and so forth. Data repository 110 may be stored in a central location, or distributed amongst multiple locations. Data objects 111 may conform to any of a variety of underlying formats, including XML and/or relational database objects. Metadata 112 may likewise take any one or more of the forms described elsewhere in this application. In an embodiment, data repository 110 is little more than a storage system that communicates conventional data blocks to data server 120 via conventional I/O operations. In embodiments, data repository 110 may comprise data handling components such as an XML parser or database server. In an embodiment, data repository 110 may not actually include metadata 112. For example, metadata 112 may be located external to data repository 110, or the techniques described herein may be practiced without the use of metadata 112.

Data server 120 comprises a search execution component 121 for receiving, processing, and returning search results to clients 130. In some embodiments, the search execution component 121 may be assisted by an ingestion component 122, graphing component 123, candidate nominating component 124, indexing component 125, link analysis component 126, candidate prioritizing component 127, metadata scoring component 128, subgraph identification component 129, and/or subgraph ranking component 151. The varying functions of each of these components are described in subsequent sections. An example information flow for communications between the components is depicted in FIG. 1; however, many other information flows are also possible. Each of these components may be logically separate and distinct components, some or all of these components may be part of the same component, and/or the functionality performed by these components may be divided amongst other components.

Though not depicted, data server 120 may further include a variety of other components. For example, data server 120 may include data access components that communicate with data repository 110 via conventional I/O operations. Data server 120 may further include components such as an XML parser, state machine, or database server, if appropriate. Data server 120 may further include components such as a web server or application server. For example, data server 120 may utilize a web server to respond to search requests from one of clients 130. Some embodiments may include additional data servers 120, which in turn include their own copies or versions of some or all of the components described above.

Clients 130 may include standalone clients such as web browsers, integrated development environments, and/or other desktop applications executing at end-user workstations. Clients 130 may also or instead include middleware applications executing at application servers, which may themselves be in communication with end-user workstations or other clients 130. System 100 may include any number of clients 130, and some or all of clients 130 may execute on some of the same computing devices as server 120.

Clients 130 may issue a variety of data-oriented requests to data server 120, including search requests. Depending on the embodiment, clients 130 may issue search requests to data server 120 in any of a variety of suitable forms using any of a variety of protocols, including HTTP, SQL, XML, and so forth. In an embodiment, each of the search requests indicates a search operation that data server 120 is to perform by searching data objects 111. Clients 130 also receive responses to the search requests from data server 120 in any of variety of suitable forms using any of a variety of protocols. For example a first client 130 may receive a web page containing table-formatted search results, while another client 130 may receive search results in the form of a ResultSet, JSON object, XML stream, or any other suitable structure.

As a practical matter, the use of a computer system in claimed embodiments is required. For example, data server 120 may be implemented by one or more computer systems executing collectively as a server. The components thereof may, for example, be implemented by one or more hardware processors of those one or more computer systems, configured to execute instructions for performing the various functions described herein. The techniques described herein should not be construed in any way as being amendable to being performed mentally or manually. Example computer systems that may be used to implement an embodiment include the computer systems described with respect to FIG. 6 and the servers configured to execute XAP applications described in U.S. patent application Ser. No. 12/782,591, entitled TYPE SYSTEM FOR BUILDING EXTENSIBLE BUSINESS APPLICATIONS, filed on May 18, 2010 by Eric Sedlar, et al., the contents of which are incorporated herein by reference for all purposes as if set forth in their entirety, and referred to hereafter as the XAP patent application.

3.0. Functional Overview 3.1. Search Request

Figure 2:
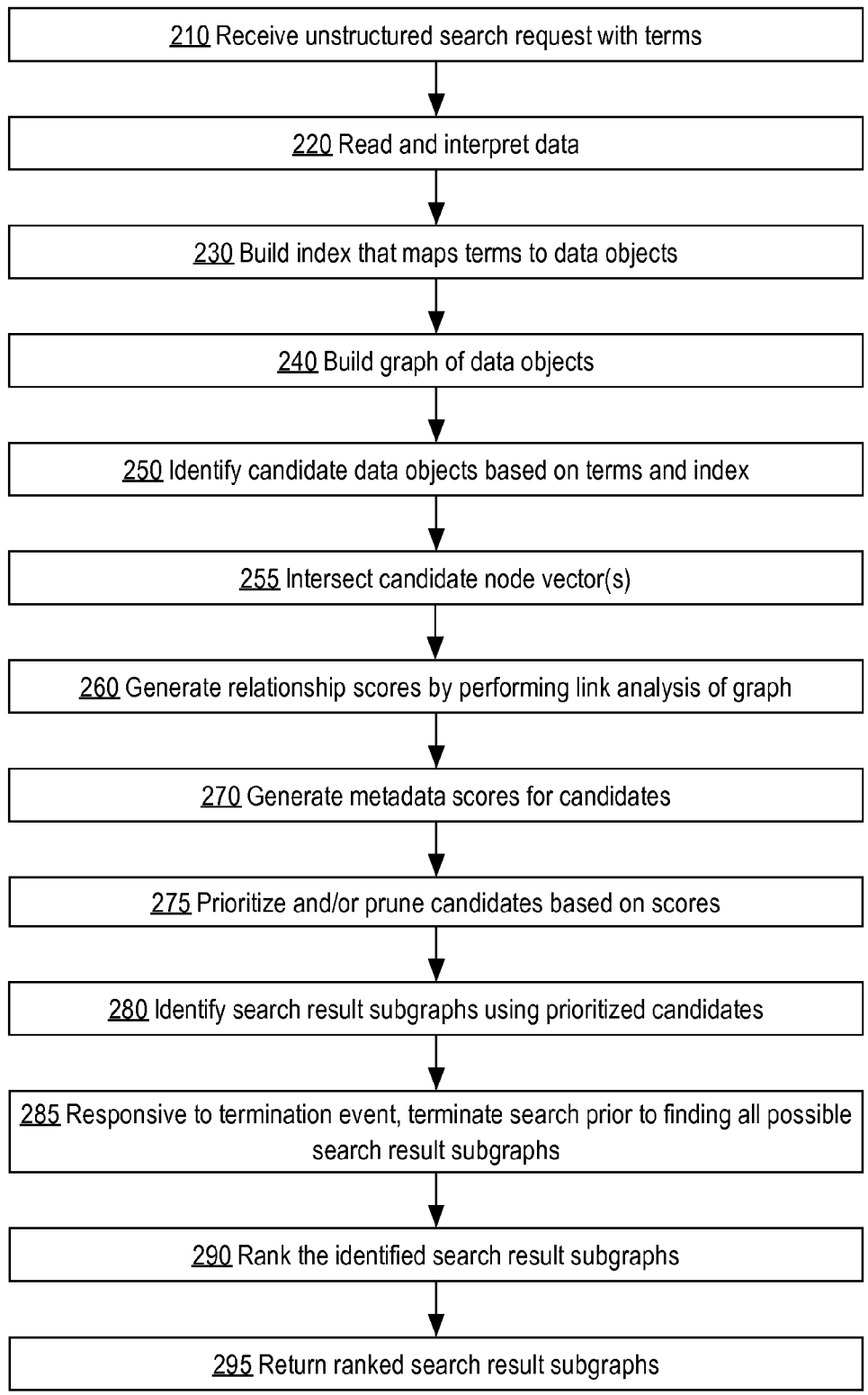
FIG. 2 depicts a flow for executing a keyword-based search for data objects.

FIG. 2 depicts a flow 200 for executing a keyword-based search for data objects, according to an embodiment. At block 210, a server receives an unstructured search request from a requestor. The search request comprises search criteria, including one or more terms (or "keywords"). The server may be any computing device, or component thereof, capable of performing a search on data objects such as data objects 111. For example, the criteria may be received by search execution component 121 of data server 120, or by a standalone indexing service that accesses a local data repository at a client computer. The terms may have been entered, for instance, via user input received at any suitable search interface presented by a client computer, such as one of clients 130. Or, as another example, the terms may have been provided programmatically from an application via an application programming interface. The terms may or may not be accompanied by other search criteria, including any of a variety of filters or search parameters supported by the search execution component.

3.2. Data Ingestion

At block 220, the server reads data structures from a data repository and interprets those structures as a collection of normalized data objects and/or metadata. The server may utilize, for example, ingestion component 122 to perform the reading and interpretation. For each data object or metadata item, the search execution component extracts constituent contents, tags, and/or links. The reading and extraction may involve, for instance, an XML parser and/or one or more queries.

In an embodiment, the server determines which data structures to read as metadata by searching for tables, documents, or document collections, in or external to the data repository, that have been marked as metadata. For example, the metadata may be in a designated system table or folder. Or, the metadata may be a collection of XML defined within a common namespace. The server interprets other data structures within the data repository as data objects.

The ingested data may include the entire set of data objects in a data repository. Or the ingested data may just be a subset of the available data, filtered by any of a variety of implicit or explicit search criteria, including without limitation permissions, identifiers, categorical information, type data, user groups, re-usability criteria, and so forth.

Though not required, in an embodiment the interpreted data objects are not necessarily entirely normalized. For example, the server may import certain normalized data objects into a referencing data object, thereby denormalizing (or "flattening") the referencing data object. Denormalization may be useful when it is known in advance that the data objects referenced by the object to be denormalized are not, by themselves, likely to be useful as search results. Various configuration rules, explicit attributes, search result usage logs, schema-based logic, search criteria, and so forth may instruct the server as to when the server should denormalize a given data object.

3.3. Indexing

At block 230, the server builds an index that maps data objects to terms associated with the interpreted data objects. The server may utilize, for example, indexing component 125 to perform the indexing. In an embodiment, the index is an inverted index in which each term is linked to a set of data objects. The terms linked to a particular data object are selected from the particular data objects's constituent contents and/or tags. In an embodiment, the indexed terms are selected only from content associated with certain fields or tags. For example, the indexed terms may be selected from content associated with descriptive tags, such as user-annotations, categorical information, labels, and names. In an embodiment, indexed terms may further be selected from certain types of related data objects.

The index may be built using any suitable indexing technique. For example, in one embodiment the data objects are transformed into a vector of indexable documents and composed into fields and values. Fields can be stored, indexed, or any combination thereof. To limit the amount of space used by the indexing, the number of indexed fields is minimized. The documents are then added to the inverted index.

3.4. Graphing

At block 240, the server generates a graph describing relationships between each of the interpreted data objects. The server may utilize, for example, a graphing component 123 to generate the graph.

As used herein, a graph is a description of a collection of items that has been optimized for the purpose of identifying relationships between those items during a link analysis of the collection. In an embodiment, a graph of a collection of data objects comprises, simply, a node for each data object and, for each particular node, one or more edges that each identify another node to which the particular node is related. However, the graph may comprise additional information as well. For example, edges or sets of edges may be associated with a relationship type indicator that indicates the type of relationship that exists between the source and destination nodes.

In an embodiment, the graph is stored entirely in-memory for fast traversal during a link analysis. However, the graph may also or instead be stored in other mediums. The graph may be stored in any suitable structures, including without limitation object collections, arrays, and/or hash tables. For example, the graph may comprise a top level array indexed to unique identifiers for each data object, with each particular element of the array comprising a separate second level array listing unique identifiers of the data objects that are related to the particular data object represented by the particular element.

Relationships

Block 240 may involve identifying the relationships between each interpreted data object so as to construct the edges of the graph. Depending on the embodiment, two data objects may be identified as related for any of a variety of reasons. In an embodiment, a data object is identified as being related to another data object if the data object explicitly links to the other data object. For example, an XML-based data object may explicitly reference an identifier of another data object in a href attribute, XLink, or other field. In an embodiment, a data object is identified as being related to another data object if the other data object is embedded within, inherits from, or is a container of the data object. In an embodiment, a data object is identified as being related to another data object if the data object is a state or type of the other data object. In an embodiment, a relationship may be discovered by following multiple links. For example, if a parent data object explicitly references a child data object, which in turn explicitly references its own child data object, the parent data object may be identified as related to the child's child by dependency even if the parent data object does not directly reference the child's child.

In an embodiment, each relationship is typed based on metadata associated with the link. Some examples of the many possible relationship types include "shipping address," "friend of," "employee of," "product," "business number," and so forth. Each type is not necessarily weighted equally. For example, a "previous address" type of relationship may be weighted much lower than a "current address" relationship type. Some types of relationships may not be included in the graph at all. In an embodiment, all identified relationships are weighted equally, and therefore need not necessarily be typed. In an embodiment, relationships are weighted based on popularity signals, such as the number of such relationships that exist in the database, click-through data from query logs, and/or the frequency with which a relationship is found in certain types of constructs, views, or queries.

In an embodiment, only relationships that indicate dependencies are graphed. That is, a data object is indicated as related to another data object only if the data object depends upon information in another data object. For example, the processing of a data object corresponding to a shipping order may depend upon information in a data object corresponding to a shipping address, but the inverse may not be true.

Directional Graph

In an embodiment, the edges in the graph are directional originating from a referencing object to a referenced object. For example, a parent data object that is required to have a child data object would have an edge to the child data object, but the child data object would not have an edge to the parent data object. As another example, a first data object that inherits data from second data object would have an edge to the second data object, but the second data object would not have an edge to the first data object.

Reverse Graph

In an embodiment, an algorithm for identifying search result subgraphs involves use of both the above-described directional graph (a "forward graph") and a reverse directional graph (a "reverse graph"). A reverse graph may therefore also be created as part of block 240, or at any other time before it is needed. In the reverse graph, the leaves of the forward graph become multiple roots of the reverse graph. For example, if the forward graph was A→B→C, the reverse graph would be C→B→A. In an embodiment, a separate reverse graph is created for each candidate node identified in block 250.

Metadata Graph

Embodiments involving metadata scoring, as subsequently described, may utilize a graph of metadata in addition to the graph of data objects. A graph of metadata may therefore also be generated as part of block 240, or at any other time before it is needed. The generation of a metadata graph, which is also described in the Metadata Application, may be performed in a manner similar to the generation of the data object graph.

3.5. Identifying Candidate Nodes

At block 250, the server identifies a set of candidate data objects, from the interpreted data objects, based on the search request. The server, or a candidate nominating component 124 thereof, utilizes the terms received in block 210 disjunctively to locate candidate items in the index of block 230, using any suitable information retrieval technique. For example, the server may look up each of the terms in the index, and add to the set of candidate items those data objects that are indexed under any of terms.

Terms may be single words or sets of words. In an embodiment, the search criteria may include conventional search directives to indicate whether a series of words in the search query are individual words, or a single term. In an embodiment, a dictionary lookup of indexed multi-word terms may be utilized to identify multi-word terms. Other techniques for identifying multi-word terms may also or instead be utilized, such as the spell-check and/or auto-complete techniques described below.

In an embodiment, the server may modify the set of terms before looking up candidate items, so as to eliminate terms not likely to be of interest, add additional terms of potential interest, correct spelling errors, and so forth. Example modification techniques are as follows.

Query Reformulation

Search requests are sometimes expressed using terms that are semantically similar to the terms found in the data objects, but nonetheless different. To account for semantic similarity, the search request may be reformulated by adding (or replacing terms with) synonyms, hypernyms, hyponyms, and so forth. In an embodiment, the terms may be further reformulated using a tagger implemented as a Hidden Markov Model or a Conditional Random Field, trained apriori to provide a part-of-speech tag to each query term. Desired parts-of-speech such as nouns or noun phrases may be located by calling into a WordNet index to apply the correct tense based on query expansion to the original terms in the query.

In an embodiment, the original terms and the reformulated terms may be used to retrieve two different sets of results. Results retrieved from the expanded query may be down-weighted during the ranking of block 290 in comparison to results returned from the original query.

Spelling Correction

In an embodiment, terms for the search request may be automatically passed into a suitable spelling correction engine composed of a dictionary of terms and phrases used in the existing data objects. Misspelled words may be automatically replaced, or proper spellings may be added to the set of search terms. Spelling correction may further rely on the availability of query logs for highly relevant corrections. In the absence of query log information during a system bootstrap, a manually curated list of queries may be injected into the query log. For example, the list of candidate queries may be the titles of each data object. Each of these titles is treated as if it were a real query posed by a real user and injected at system bootstrap time into the spelling dictionary and the query logs. In an embodiment, a candidacy test is performed on terms that have been identified as misspelled. If those terms do in fact produce results within the collection of metadata, the terms may also be added to the dictionary.

Auto-Complete

In an embodiment, a query log index maintained for spelling correction may be further leveraged for providing suggestions for query completion. Auto-completion is an interactive process whereby a list of suggested query completions is continuously refined with each typed keystroke in the search box. If resources are available, results may also be provided based on the highest ranking suggestion. Query completions may be used to reduce the amount of typing activity and the rate of misspellings. They also serve as a quick preview into the available concepts or constructs in the metadata.

3.6. Intersecting Disjunctive Candidate Node Vectors

In an embodiment, a separate vector of candidate nodes is identified for each term in block 250. At block 255, the dimensionality of the search may be reduced by intersecting candidate node vectors to identify duplicate nodes. In an embodiment, when two different nodes produce intersecting nodes at a frequency above some minimum threshold, the candidate node vectors may be intersected entirely. In other words, any node that is only returned by one of the terms may be discarded altogether.

For example, in the query "Larry Ellison stock grants," it is certainly possible that the terms "Larry" and "Ellison" can appear separately inside data objects. But it is more likely that "Larry Ellison" was intended to be searched as a single term. By intersecting result vectors for these two terms, and optionally discarding nodes that only contain one of the two terms, the dimensionality of the algorithm in block 280 may be greatly reduced.

3.7. Link Analysis Scoring of Candidate Nodes

At block 260, the server performs a link analysis of the graph of block 240 to produce a relationship score for at least each candidate node. The link analysis may be performed by a component such as link analysis component 126. In an embodiment, the link analysis is configured to measure the relative importance of each item in a set of items, which in this case is the collection of data objects (or, in some embodiments, just the candidate set thereof). Data objects that are more heavily referenced within the metadata collection have higher scores than lesser referenced data objects. In an embodiment, the link analysis involves, in part, assigning weights to the edges (relationships) and nodes (data objects) in the graph, with a node's weight being proportional to that node's in degrees. The weights are then used to calculate a score reflecting the relative importance of each node.

Any technique or combination of techniques that return a score for items based on a graph may be utilized for the link analysis. Examples of algorithms for link analysis include, without limitation, Hyperlink-Induced Topic Search, PageRank, CheiRank, TrustRank, and variations thereof. For example, in an embodiment scores are calculated by executing an iterative or algebraic PageRank algorithm, such as described in L. Page, S. Brin, R. Motwani, and T. Winograd. The PageRank citation ranking: Bringing order to the web. Stanford Digital Libraries Working Paper, 1998, the entire contents of which are hereby incorporated by reference for all purposes as if set forth herein.

3.8. Metadata-Based Scoring of Candidate Nodes

At block 270, a metadata-based score is assigned for each of the candidate nodes. Metadata scoring may be performed, for instance, by a component such as metadata scorer 128. Each candidate node is associated with a corresponding metadata item that defines constraints upon the structure of the data object for which the candidate node was created. The metadata score for the candidate node is the score assigned to that node's corresponding metadata item.

In an embodiment, the metadata score for a given metadata item may be based on a link analysis of a metadata graph, similar to the link analysis of the data object graph. The link analysis is configured to measure the relative importance of each item in the metadata collection. Metadata items that are more heavily used (or reused) within the metadata collection have higher scores than lesser used metadata items. In an embodiment, the link analysis involves, in part, assigning weights to the edges and nodes in the graph, with a node's weight being proportional to that node's in degrees. The weights are then used to calculate a score reflecting the relative importance of each node.

In an embodiment, the metadata score is also or instead based on how often a given metadata item has been utilized in metadata joins for a specific type of construct. For example, some enterprise data systems feature user-defined constructs known as Sheets, which are essentially user-defined views of a variety of data objects that have been joined based on, for example, foreign keys. Candidate nodes that conform to certain metadata type might be ranked in proportion to the weights of their metadata constructs obtained by cross referencing the metadata link graph. This is done to capture implicit node authority in a link graph where some constructs may be more important than others and some edges (relationships) might be more important than others, thereby influencing ranking. For example, Candidate nodes that conform to metadata items that are more frequently pulled into Sheets and other such user-defined construct may be scored more highly than candidate nodes that are not.

Other techniques for scoring metadata items using a link analysis are described in the Metadata Application.

3.9. Prioritizing/Pruning Candidate Nodes

At block 275, the set of candidate nodes is ordered so as to prioritize nodes that are more likely to yield relevant search result subgraphs. In an embodiment, the server determines an order for the nodes that is based on a priority score. The priority score is a function of the scores determined in block 260 and/or block 270. The ordering may also or instead be based on term-based scoring of the nodes, such as a term-frequency score. The ordering may also or instead be based on a popularity-based scoring of the nodes, such as how often each node has been returned as part of a result set for a query, or how often each node has been a member of a search result subgraph that has actually been selected by a user in a search result listing. Popularity-based scoring may further be time-decayed so as to weight nodes that have been more recently popular higher. In an embodiment, each of the above factors may be assigned different weights when ordering the candidate nodes.

In an embodiment, block 275 involves pruning the candidate nodes to remove the lowest priority candidate nodes. For example, the priority score may also be compared to a priority threshold score. Those nodes scoring below the priority threshold score may be discarded. As another example, any node that is not within a top number of nodes in the ordering may be removed.

In an embodiment, pruning occurs separately from prioritizing, in that pruning is based on a different set of factors than the priority score. For example, a node's metadata score may determine whether the node should be pruned. Any remaining nodes may then be ordered in accordance with the relationship score (or any other suitable priority score). In an embodiment, pruning is performed alone, without the candidate nodes being placed in any prioritized order.

The ordering and/or pruning of the candidate nodes may be performed by, for instance, a component such as candidate prioritizer 127. In an embodiment, a prioritized ordering of the nodes takes the form of a queue, with the highest priority node at the head. However, other orderings are also possible.

3.10. Locating Search Result Subgraphs

At block 280, once the candidate nodes have been prioritized and/or pruned, the server utilizes the candidate nodes to locate one or more search result subgraphs that are responsive to the search request. The server may locate search result subgraphs, for example, using the subgraph identification component 129.

Search Result Subgraphs

A subgraph comprises a root node and one or more branches of descendant nodes. In the context of block 280, each subgraph is a subgraph of the graph computed in block 240. A search result subgraph is a set of related nodes that, for each particular term of the terms used to identify candidate nodes in block 250, contains at least one candidate node that was identified for that particular term. Put another way, a search result subgraph is a subgraph that includes at least a set of candidate nodes, the set comprising one candidate node from each candidate node vector produced by block 250.

The root node of the search result subgraph is, in the context of the forward graph computed in block 240, a common ancestor of the set of nodes. For example, consider a full name object A which has child objects for first name B and last name C. If B and C are candidate nodes, A would be, as the parent node of both B and C, a common ancestor of B and C. Therefore, A may serve as a root node of a search result subgraph, having B and C as its branches. In an embodiment, the root node for a search result subgraph is the closest common ancestor of a set of candidate nodes, but in other embodiments this need not always be the case. The root node is on many occasions not a candidate node itself, but may nonetheless also be candidate node.

The search result subgraph need not necessarily comprise each and every descendant of any given node in the subgraph. For example, if node A in the subgraph has branches for child objects B, C, and D, but only the B and C branches include candidate nodes, D need not be included in the search result subgraph (but optionally may be included).

Search Result Subgraph Identification Techniques

A number of techniques may be utilized to identify search result subgraphs. For example, a simple technique may be to identify each possible set of candidate nodes that includes at least one candidate node identified for each term in block 250. For each set, the server may traverse the graph upwards from each candidate node in the set until a common ancestor is found. A search result subgraph may then be constructed that includes the common ancestor and all nodes between the common ancestor and each candidate node in the set.

Many other suitable techniques may instead be utilized to identify search result subgraphs, including BANKS and BLINKS as described earlier in the application. Most of the techniques for search result subgraphs described thus far have been bottom-up, in that they start with candidate nodes and traverse the graph upwards looking for common ancestors. However, top-down techniques are also possible. For example, the server may iterate through each node of the graph of block 240 to determine whether the descendants of that node include candidate nodes from each candidate node vector. If so, the node and its branches is identified as a search result subgraph.

Another example technique is described in detail in Section 4.1.

Prioritizing Higher-Priority Candidate Nodes

In some embodiments, the search result subgraph identification process may be optimized to consider higher-priority candidate nodes ahead of lower-priority candidates, as determined in block 275. For example, some variations of the BANKS technique may maintain an ordered queue of candidate nodes to expand. The queue may be populated in a manner that favors expansion of higher-priority nodes ahead of lower-priority nodes. As another example, in the example technique where each possible set of candidate nodes is evaluated individually, examination of the sets may occur in an order that is at least partly based on the average candidate node priority score for each set. Other optimization strategies for higher-priority candidate nodes are also possible.

3.11. Termination Events/Constraints

In an embodiment, highly relevant search result subgraphs may be located relatively quickly by enforcing constraints upon the process of locating search result subgraphs. Based on these constraints, the server terminates the attempt to identify search result subgraphs prior to the server locating each and every possible search result subgraph, under the assumption that most or all of the highly-relevant subgraphs will already have been located. At block 285, then, in response to a termination event that reflects one or more of these constraints, the search result identification process is terminated without locating all possible search result subgraphs.

Early termination would conventionally yield result sets that are missing many or all relevant search result subgraphs, because not all search result subgraphs would have been considered. As a result of the prioritization and pruning of candidate nodes in block 275, however, the techniques described herein are much more likely to find the most highly relevant search result subgraphs first. Thus, the likelihood of missing highly relevant results upon early termination is greatly reduced. Early termination is optional, depending on the embodiment.

Maximum Depth

In an embodiment, the depth of a search result subgraph is constrained by a predefined maximum size. Because of this constraint, the server only needs to attempt to locate search result subgraphs whose root nodes are within a certain number of links to each candidate node in the subgraph. For example, in the bottom-up identification techniques described above, the server only needs to evaluate nodes within the predefined number of links from each candidate node as possible common ancestors. Evaluation for common ancestors may thus be terminated upon traversing to a node whose distance from a candidate node is greater than the predefined number. Reducing the maximum possible depth of a search result subgraph thus reduces the amount of nodes that need to be traversed in search for search result subgraphs.

A constraint on maximum depth may be imposed, for instance, based on search criteria and/or general configuration parameters reflecting assumptions about the likely usefulness of subgraphs of a certain size. In one embodiment, the maximum depth is 3, but other embodiments may feature different maximum depths.

For example, consider a graph in which nodes B and C have a common ancestor of A. The chain of nodes from B to A (i.e. the reverse graph) is B→D→E→F→G→A. The chain of nodes from C to A is C→A. The server would discover that A is a common ancestor as long as the maximum depth is 6 or more. However, if search result subgraphs are constrained to a maximum depth of 3, the server would terminate searching for search result subgraphs before discovering that A is a common ancestor. Nonetheless, depending on the nature of the data, A may be so distant from B that the connection of B to C via the common ancestor of A is not particularly interesting, and thus a subgraph based on node A would not be a very relevant search result. By limiting the maximum depth of the subgraph, the complexity of the search result subgraph process can thus be greatly reduced with minimal effect on the efficacy of the search results.

Maximum Number of Results

In an embodiment, the server only attempts to locate only a predefined number of search result subgraphs. The server maintains a counter of the number of search result subgraphs located thus far. When the counter passes a certain number, the search result subgraphs are returned to the user. In an embodiment, after the server has located the maximum number of search result subgraphs, the subgraph identification process may be terminated, thus greatly reducing the resources necessary to execute the search. In an embodiment, the subgraph identification process may continue either in the background while search result subgraphs are returned to the user, or upon a request from the user for additional search results.

In other embodiments, instead of a maximum number of results, a maximum amount of time is allocated to the search, and results are returned after the maximum amount of time elapses.

3.12. Ranking Search Result Subgraphs

The server may either return the search result subgraphs in the order they are discovered, or the server may re-rank the search result subgraphs before they are returned. In the latter case, at block 290, the server calculates a ranking score for each search result subgraph. The server may utilize, for instance, subgraph ranking component 151 to calculate the ranking. Any suitable ranking technique may be utilized. For example, in one embodiment, the ranking score is a combination of node weights (in degrees) and/or edge weights for each node in the search result subgraph. In another embodiment, the ranking score is simply a function of the number of nodes and/or the number of edges in the search result subgraph.

The server sorts the search result subgraphs based on their ranking scores. The server may do so, for instance, by comparing the ranking scores for each search result subgraph. In an embodiment, certain search result subgraphs may be discarded based on their scores. For example, search result subgraphs whose ranking score is below a pre-defined threshold score may be pruned. As another example, only a top pre-defined number of search result subgraphs may be returned. In some embodiments, however, search result subgraphs are returned in exactly the same order as they were identified.

In an embodiment, the ranking score is a combination of two or more of the scores described in blocks 260-275, computed for each node in the search result subgraph. In an embodiment, additional scores reflecting other relevance signals may also be incorporated into the ranking score. In an embodiment, only scores for certain nodes within a search result subgraph—for example, only the scores of the candidate nodes—are included when calculating a subgraph score.

In an embodiment, each score used to calculate the final ranking score is weighted as part of a parameterized ranking function. For instance, the relationship scores for each node in the subgraph may contribute more or less significantly to the ranking score than the node authority scores and/or the vector space scores. In an embodiment, the ranking score is $S(n)=Lambda(V(n))+(1-Lambda)*(P(n))$, where $S(n)$ is the combination score of a data object (or node—n), $V(n)$ is a vector space score of n, $P(n)$ is a relationship score of (n), and Lambda is a combination co-efficient that essentially weights $V(n)$ and $P(n)$. The combination score could either be additive of multiplicative.

In an embodiment weights are assigned by an expert, and modified throughout deployment as needed. In an embodiment, the weights are learned and/or relearned using any suitable machine learning mechanism, including without limitation linear regression algorithms, gradient descent algorithms, expectation-maximization algorithms, and/or Dynamic Bayesian Networks. The machine learning mechanisms may utilize, for instance, logs of search requests and corresponding click-through data for search results.

3.13. Returning the Result Set

At block 295, the server provides data indicating each search result subgraph in the result set to the requestor. The result set may be returned in a variety of forms, including XML, tables, web pages, and so forth. In an embodiment, the result set is returned in a web page comprising a flattened view of each search result subgraph of the result set, and further featuring controls for performing various actions with each search result subgraph, such as editing constituent data objects, locating related data objects, performing calculations on data within the search result subgraph, locating metadata related to data objects within the search result subgraph, and so forth. In an embodiment, the result set is returned as a list of data object identifiers, by which a client may look up and retrieve any information necessary to generate its own display of information about the data objects in each search result subgraph in the result set.

Specific examples of techniques for displaying results sets comprised of search result subgraphs are described, without limitation, in the Search Result Display Application.

3.14. Variations

Flow 200 is but one example of a flow for executing searches using the described techniques. Other flows may feature fewer or additional elements, in varying orders. For example, some flows may omit the calculation of any of the scores determined in blocks 260-275. Generation of a graph that is separate from the data repository itself may also be optional in embodiments that omit the link analysis or perform the link analysis by traversing references in the data object collection directly. As another example, some or all of blocks 220-240, 260-270 may be performed at any time relative to the search request. For instance, the server may execute background processes for building indices and graphs in advance of the search request, and then cache the index and graph for use in any number of search results. The indices and graphs may be updated or rebuilt periodically or in response to trigger events, such as significant changes to the metadata. Depending on the resources available to the server, scores for blocks 260-275 and even portions of blocks 280-290 may also be performed in advance for quicker search request response time.

In an embodiment, other search criteria received in the initial search request may also affect the search. For example, the initial search request may specify constraints on the data objects that are searched, additional ranking factors, sort orders, and so forth.

Figure 3:
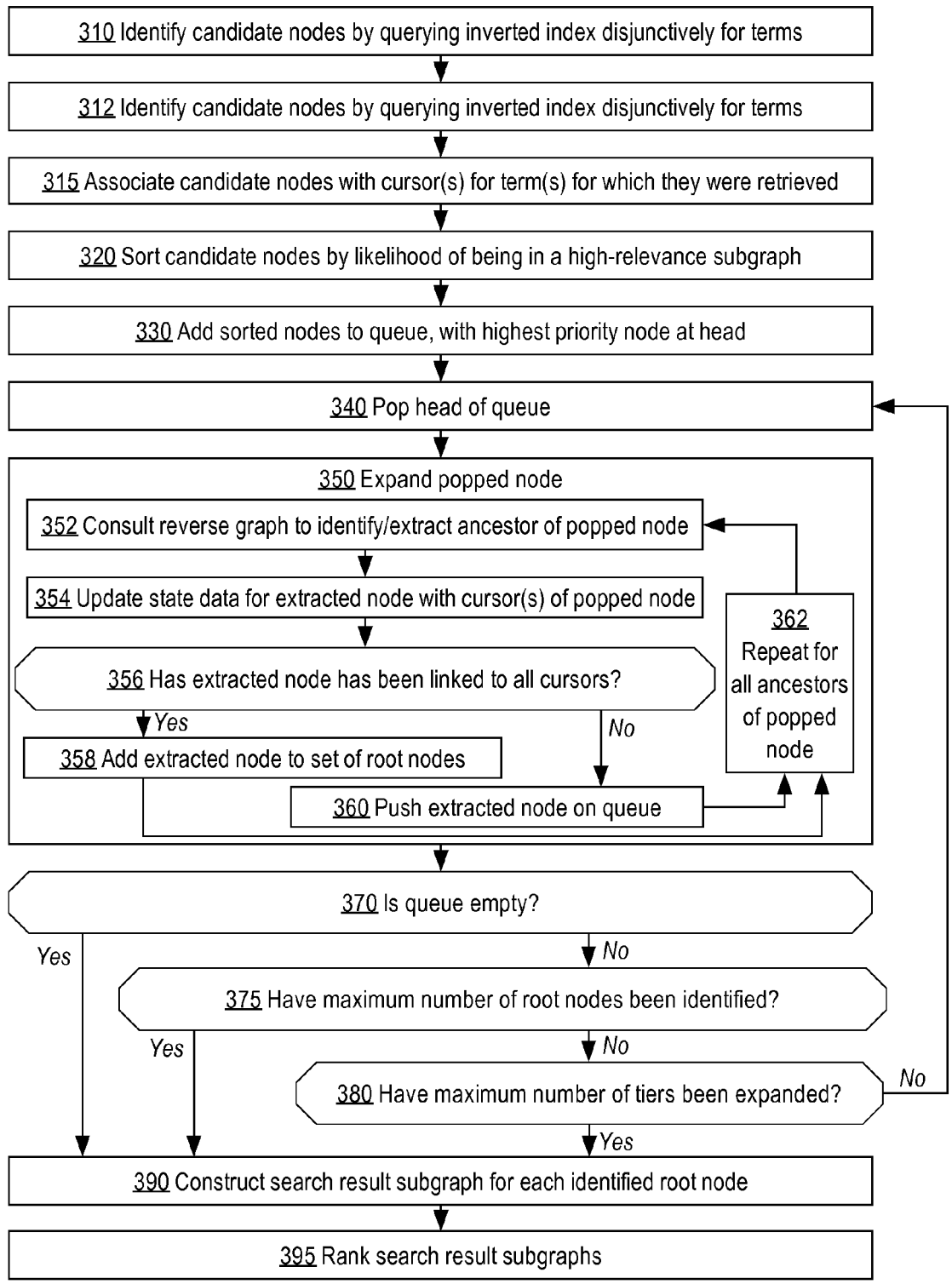
FIG. 3 is an example flow for identifying search result subgraphs.

In an embodiment, the server may push search result subgraphs to the requesting client as soon as they are located, with the client being configured to continually update a display of the search result subgraphs to include each newly located search result subgraph. In embodiments where the search result subgraphs are to be sorted by ranking scores, the server may include a ranking score with each new search result subgraph that is pushed to the client, or the client may calculate the ranking score for a search result subgraph itself. In either case, the client may continually sort the display of search result subgraphs based on the ranking scores as the subgraphs are received from the server. In an embodiment, the server may terminate such a search in response to termination events as described above. In embodiments, the server may terminate such a search in response to input from the user indicating that the user is done searching, such as an explicit instruction to stop the search or the user selecting to perform an action with respect to one of the search result subgraphs 4.0. Implementation Example 4.1. Example Search Result Subgraph Identification Flow FIG. 3 is an example flow 300 for identifying search result subgraphs, according to an embodiment. Flow 300 is an example of a technique that has been adapted for discovering subgraphs with higher-priority candidate nodes ahead of subgraphs for lower-priority candidate nodes. Flow 300 assumes that a data object graph and inverse index have already been built. Flow 300 further assumes that set of search terms has already been refined, if necessary, through query reformulation, spelling correction, and any other techniques that may be appropriate.

At block 310, for each search term of a multi-term query, a server queries the inverted index disjunctively to locate data objects whose contents or attributes include the search term. The server saves a list or other suitable structure of node identifiers identifying each data object that was located. These node identifiers are candidate nodes, as in block 250 of FIG. 2.

At block 312, a cursor or other suitable structure is created for each search term. The cursors are used to track which nodes have been "visited" by which terms during graph traversal, so as to be able to recognize common ancestors of the candidate nodes.

At block 315, each node is associated with cursor(s) identifying the terms(s) for which the node was identified.

At block 320, the server sorts the nodes by their likelihood of being part of a highly relevant search result subgraph. This likelihood may be quantified, for example, using the priority score of block 275 in FIG. 2, or any other suitable score described in blocks 260-275. The server optionally prunes low-scoring nodes, as also described in block 275.

At block 330, the server adds each of the nodes to a queue for processing, in the order by which they were sorted in block 320, with the highest priority node at the head of the queue.

At block 340, the server pops the head of the queue.

At block 350, the server expands the popped node. Expansion comprises blocks 352-362.

At block 352, the server consults a reverse graph to identify an ancestor node (outlink) of the popped node.

At block 354, the server adds or updates state data associated with the extracted node, including data identifying the popped node and data linking the extracted node to the cursor(s) associated with the popped node.

At block 356, the server evaluates all state data associated with the extracted node to determine whether the extracted node has been linked to every search term cursor. If so, then the extracted node has been expanded for all search terms and is therefore a common ancestor to at least a set of candidate nodes comprising each of the search terms. At block 358, the extracted node is thus added to a set of root nodes for search result subgraphs. Flow then proceeds to block 362.

If, at block 356, the extracted node was not linked to every search term cursor, then at block 360 the extracted node is pushed on to the queue for future processing.

At block 362, blocks 352-360 are repeated for each ancestor node of the popped node, as indicated by the reverse graph.

At block 370, the server determines whether the queue is empty. If the queue is empty, flow proceeds to block 390. Otherwise, flow proceeds to block 375.

At block 375, the server compares the number of root nodes that have been identified for search results subgraphs to the maximum number of search result subgraphs to be returned. If the maximum number has been reached, flow proceeds to block 390. Otherwise flow proceeds to block 380.

At block 380, the server determines whether a maximum number of tiers has been expanded. If so, then any additional search result subgraphs that could be discovered would exceed the maximum depth. Flow thus proceeds to block 390. Otherwise, flow returns to block 340 to pop another node off the queue. The determination of block 380 may occur in a number of ways. For example, each node may be tagged with state data indicating a tier number, which is either 0 for the initial candidates, or 1 greater than that of the node from which a node was expanded. The current tier may be determined by examining the tier associated with the next node in the queue. Or, the current tier may be calculated by counting the maximum number of links in each chain of nodes from which the next node in the queue was expanded, if any.

At block 390, for each root node in the set of root nodes identified in block 358, the server constructs a search result subgraph. The search result subgraph comprises the root node and one or more branches to candidate nodes. The branches are created by evaluating the state data associated with the root node and recursively identifying the chain(s) of node(s) from which root node was expanded.

At block 395, each of the search result subgraphs is ranked, using, for instance, the factors described with respect to block 290.

Flow 300 is a very specific technique, and other suitable flows are possible that feature fewer or additional steps in varying order. As one example of the many possible variations, in an embodiment, a stack or a priority queue may be used instead of a queue, resulting in the nodes pushed during the expansion being considered before nodes already in the queue. As another example, subgraphs may be reconstructed and/or ranked as the are found, in parallel with node expansion. As another example, block 375 may be performed immediately after each new root node is discovered.

Example pseudo code for a technique similar to flow 300 is as follows:

```
Q ← S; Q ← Ø
X ← K(t);
Max_tiers = 3;
GRAPH-SEARCH( )
1  for each keyword term t
2    X(t) ← query the inverted index disjunctively, save results
3  Sort each X(t) in decreasing order of node pagerank (PR)
4  Add each node from each X(t) to the queue (Q)
5  while Q is not empty and number of tiers expanded < Max_tiers
6    Pop the head of the queue N ← pop(Q)
7    push(Q) ← EXPAND(N)
9  END
EXPAND(N)
1 OL(N) ← consult the reverse graph and retrieve (outlinks) linked nodes from N
2 add metadata to each of the extracted nodes (tier, node_id, parent_id, cursor(term pos in original query))
3 for each node X in OL(N)
4 if not CHECK_TERMINATION(X)
5 push (Q) ← X
CHECK _TERMINATION(X)
1  if X was visited by all cursors
2  RANK(X)
3  create a search result tree SRT
4  set root node of SRT ← X
5  create size_of(K) ordered lists to track paths from root to leaf in SRT
3  add(S) ← COMPUTE_TREE(X)
4  return TRUE
5  else
6    return FALSE
COMPUTE_TREE(X)
1
1  for each parent p(x) : X
2    if p(x) is not null
3      SRT.get(ordered_list for p(x)'s cursor).add(p(x))
3      COMPUTE_TREE(p(x))
4    else
5      return
```

4.2. Walk-Through for Example Technique

The following example data objects may be utilized to illustrate the application of the techniques described herein on a small data repository. Data object 1 is an "Order" object, having the fields product_id=110 and customer_id=220. Data object 2 is a "Product" object, having the fields product_id=110 and product_name=laptop. Data object 3 is a "Customer" object, having the fields customer_id=220 and customer_name=John Doe.

An inverted index may be generated based on these data objects as follows:

| (Terms) | ← (Data object ids) |
|---|---|
| customer | ← 1, 3 |
| doe | ← 3 |
| ...... | |
| ..... | |
| john | ← 3 |
| laptop | ← 2 |
| order | ← 1 |
| product | ← 1,2 |

A forward graph would be generated as follows:

Forward graph

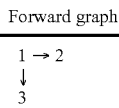

A reverse graph would be generated as follows:

Reverse graph

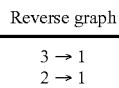

Upon receiving the sample query: "order john laptop," inverted index lookups would be performed for each of "order," "john," and "laptop." Candidate data objects (nodes) would thus be identified as follows: order←1, john←3, laptop←2.

Document 1 does not contain the words john or laptop, but contains order. Documents 3 and 2 contain the other 2 terms in the query. By consulting the reverse graph and expanding nodes 3 and 2 out to node 1, it becomes clear that node 1 is a root node for a search result subgraph. In this particular case, the subgraph is the same as the forward graph. Of course, with larger data sets, each search result subgraph would likely be but a small excerpt from the forward graph.

4.3. Example Data Object Graph

Figure 4:
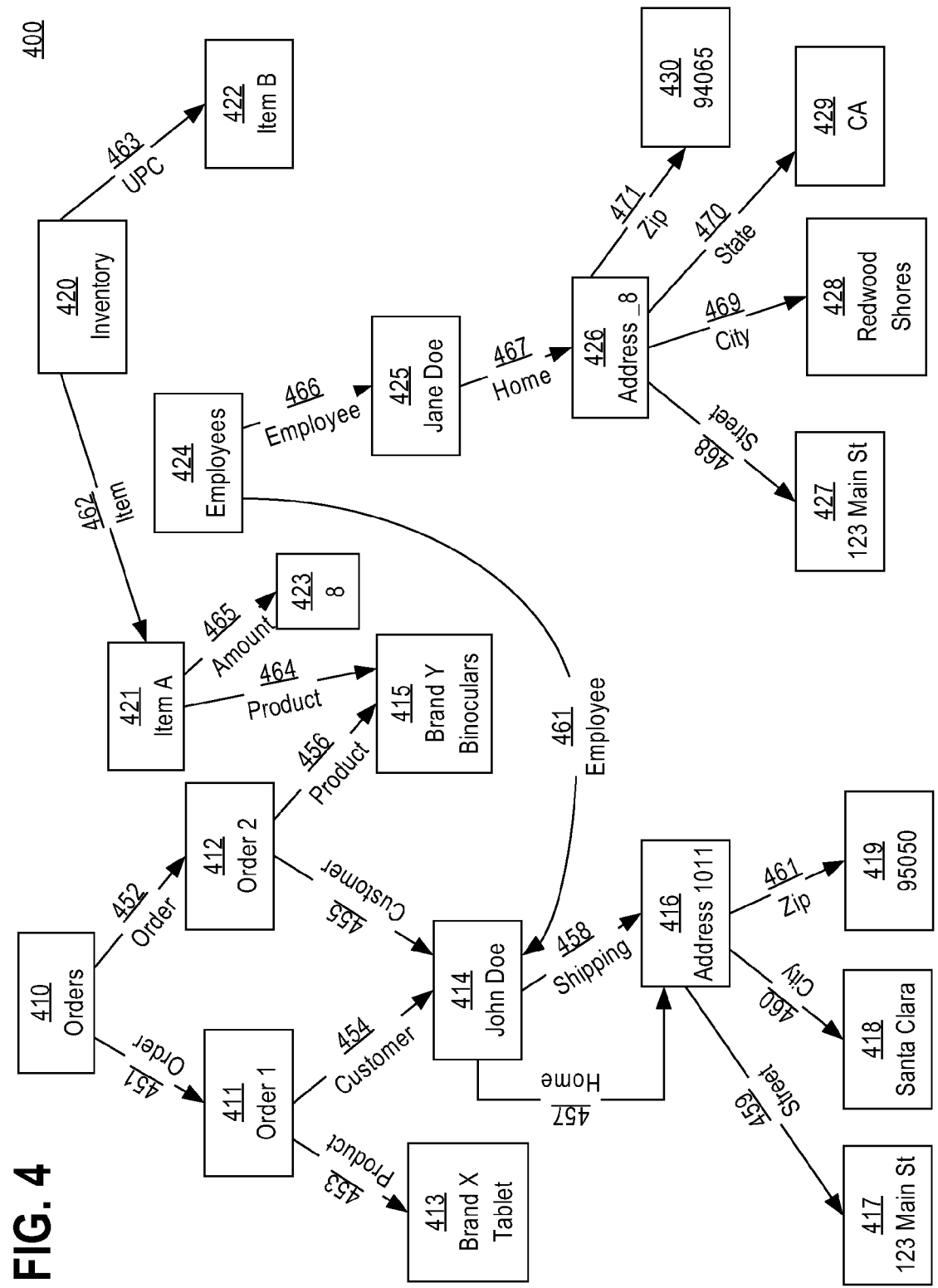
FIG. 4 is a block representation of a graph of normalized data objects.

FIG. 4 is a block representation of a graph 400 of normalized data objects, in accordance with an embodiment of the invention. FIG. 4 comprises a plurality of nodes 410-429 and a plurality of edges 451-471. Each of nodes 410-429 represents a searchable data object in a repository of metadata items. Each of edges 451-471 represents a dependency relationship of nodes 410-429. Graph 300 is not necessarily a complete graph of a data repository, but rather illustrative of the graphing techniques described herein.

For example, node 414, labeled "John Doe," is indicated by the directional arrow of edge 454 to have a "Customer" relationship with node 411, labeled "Order 1." Node 411 is accordingly dependent upon node 414. Similarly, node 426, labeled "Address_8," is indicated by the directional arrow of edge 467 to be a "Home Address" of node 425, labeled "Jane Doe." Node 425 is accordingly dependent upon 426.

Link Analysis of Graph

In an embodiment, a simple link analysis of graph 400 would produce a relationship score for each node 410-429 that is equal to the number of edges 451-471 that are directed into the node. For instance, John Doe node 414 has three edges 454, 455, and 461 that are directed into it. John Doe node 414 would thus have a relationship score of 4. Meanwhile, "Jane Doe" node 425 would only have a relationship score of 1, since only edge 466 is directed into it. All other factors being equal, then, a search involving the term "Doe" would prioritize node 414 ahead of node 425.

In other embodiments, more complex link analyses would produce different relationship scores for each node. For instance, in an embodiment, each node begins with an equal relationship score, and the link analysis involves iteratively transferring a portion of each node's relationship score to all nodes that the node transitions into. In an embodiment, the relationship score for each node is also a function of weights assigned to the different types of edges leading into the node. For example, relationship types of "Employee," as shown in edge 466 may be used much more frequently in queries and views of data in the data repository than relationship types of "Customer," as shown in edge 455. Scores transferred over edge 466 may therefore be weighted much higher than scores transferred over edge 455.

Example Search Result Subgraphs

A search for the terms "John Tablet 95050" would yield three candidate nodes—nodes 413, 414, 419. Since node 411 is the common ancestor of each of these candidate nodes, a search result subgraph for such a query could include nodes 411, 413, 414, 416, and 419.

A search for the terms "Doe Main St" would yield candidate nodes 414, 417, 425, and 427. Based on these candidate nodes, two different subgraphs would be located, having roots at 414 and 425. However, since node 414 would likely have the highest priority in view of node 414 having the highest in degrees (which usually translates to a higher relationship score), the subgraph rooted at 414 would be discovered first.

A search for "Jane Binoculars" would yield two candidate nodes 415 and 425. However, since the nodes do not have a common ancestor, no result would be returned.

A search for 95050 and 94065 would yield two candidate nodes 419 and 430. The Employees node 424 is a common ancestor node of these two nodes. In an embodiment, however, a maximum depth could be imposed, such as 3, which could result in employees node 424 not being found.

4.4. Example Metadata Graph

Figure 5:
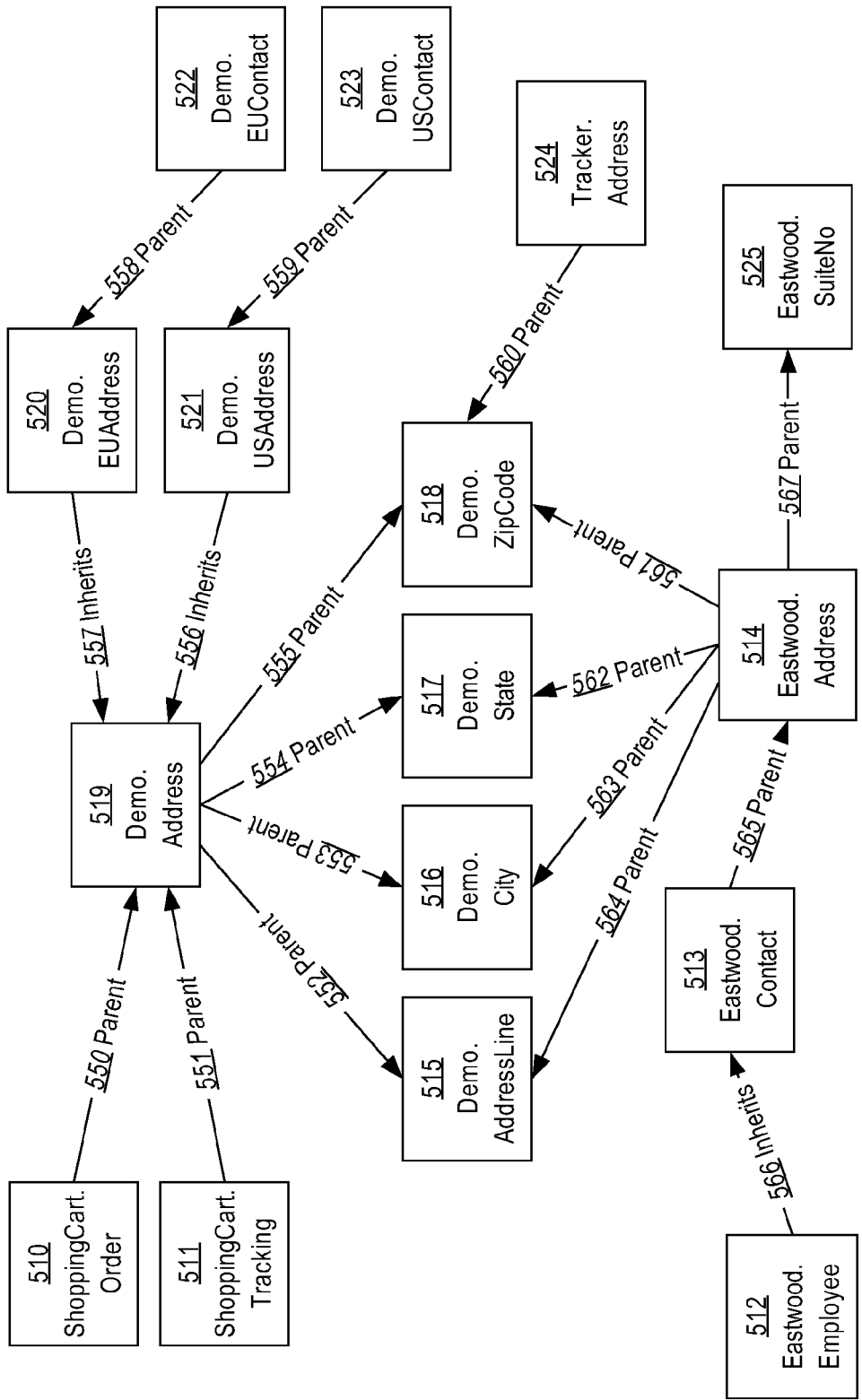
FIG. 5 is a block representation of a graph of metadata items.

FIG. 5 is a block representation of a graph 500 of metadata items, in accordance with an embodiment of the invention. FIG. 5 comprises a plurality of nodes 510-525 and a plurality of edges 550-567. Each of nodes 510-525 represents a metadata item in a repository of metadata items. Each of edges 550-567 represents a dependency relationship of nodes 510-525. Graph 500 is not necessarily a complete graph of a metadata collection, but rather illustrative of the graphing techniques described herein.

For example, node 519, labeled "Demo.Address," is indicated by the directional arrow of edge 553 to have a "Parent of" relationship with node 516, labeled "Demo.City," and is accordingly dependent upon node 516. Similarly, node 514, labeled "Eastwood.Address," is indicated by the directional arrow of edge 563 to be a "Parent of" node 516, and is accordingly also dependent upon node 516. As another example, node 520, labeled "Demo.EUAddress" is indicated by the directional arrow of edge 557 to have an "Inherits From" relationship with node 519, labeled "Demo.Address," and is accordingly dependent upon node 519.

In an embodiment, a simple link analysis of graph 500 would produce a relationship score for each node 510-525 that is equal to the number of edges 550-567 that are directed into the node. For instance, Demo.Address node 519 has four edges 550, 551, 558, and 559 that are directed into it. Demo.Address node 519 would thus have a relationship score of 4. Meanwhile, Eastwood.Address node 514 would only have a relationship score of 1, since only node 565 is directed into it. All other factors being equal, then, a data object constrained by the metadata represented by the Demo.Address node 519 would be ranked ahead of a data object constrained by the metadata represented by the Eastwood.Address node 514.

In other embodiments, more complex link analyses would produce different relationship scores for each node. For instance, in an embodiment, each node begins with an equal relationship score, and the link analysis involves iteratively transferring a portion of each node's relationship score to all nodes that the node transitions into. In an embodiment, the relationship score for each node is also a function of weights assigned to the different types of edges leading into the node.

4.5. Example Metadata and Data

According at an embodiment, metadata for a repository such as data repository 110 may be specified using an XML syntax set forth within a namespace known as XAP, as discussed in the XAP patent application. The XAP syntax comprises three main constructs: an element construct, a type construct, and a state construct. As an example, the metadata item corresponding to the Demo.Address node 519 of graph 300, depicted in FIG. 5, may be an element construct described by the following XML:

```
<xap:element xmlns:xap="http://xap.oracle.com" xap:docid="A6"
    xap:id="_0">
<xap:name xap:id="_1">address</xap:name>
<xap:uri xap:id="_2"> http://xap.oracle.com/demo</xap:uri>
<xap:label xap:id="_3">Address</xap:label>
<xap:defaultType xap:href="/xap/sys/get?docid=B3" xap:id="_4"/>
<xap:description xap:id="_5">A address has the following fields : -
    addressline - city - state - zipcode</xap:description>
</xap:element>
```

Among other aspects, the various tags, attributes, and contents of the above description provide the Address metadata item with a name ("address"), namespace ("http://xap.oracle.com/demo"), and a description ("A address has the following fields: -addressline-city-state-zipcode"). The "xap:defaultType" tag further provides a type definition of the internal structure to expect, by default, from any data object conforming to this metadata item. In this particular case, the type definition is provided by way of an "xap:href" attribute, which is a reference to type construct having an internal identifier of "B3." The type construct B3 is therefore said to have a "Type Of" relationship with the element construct set forth above.

An XML description of the B3 type construct may be as follows:

```
<xap:type xmlns:xap="http://xap.oracle.com" xap:docid="B3"
    xap:id ="_0" xap:states="104">
<xap:name xap:id="_1">Address</xap:name>
<xap:uri xap:id="_2">http://xap.oracle.com/demo</xap:uri>
<xap:elementRef xap:href="/xap/sys/get?docid=A6" xap:id="_3"/>
<xap:defaultState xap:href="/xap/sys/get?docid=BA" xap:id="_4"/>
<xap:label xmlns:xap="http://xap.oracle.com" xap:id="_9">Address
    </xap:label>
</xap:type>
```

The above XML description provides a variety of information similar in nature to that set forth in the element construct for the Address metadata item. Of further interest, the "xap:elementRef" tag may be used to provide backwards relationship information by which element constructs that refer to the type construct may be located. The "xap:defaultState" tag further provides a description of a default state for constraints that should be applied to any data object conforming to the type construct. The state definition is provided by way of reference to a state construct having an XAP identifier of "BA." A "State Of" relationship is therefore established between the B3 type construct and the BA state construct.

An XML representation of the the BA state construct may be as follows:

```
<xap:state xmlns:xap="http://xap.oracle.com" xap:docid="BA"
    xap:id="_0">
<xap:name xap:id="_1">Address</xap:name>
<xap:uri xap:id="_2">http://xap.oracle.com/demo</xap:uri>
<xap:typeRef xap:href="/xap/sys/get?docid=B3" xap:id="_3"/>
<xap:constraint xap:id="_4">
<xap:subelement xap:id="_5"><xap:elementRef
    xap:href="/xap/sys/get?docid=92"
    xap:id="_6"/></xap:subelement>
</xap:constraint>
<xap:constraint xap:id="_7">
<xap:subelement xap:id="_8"><xap:elementRef
    xap:href="/xap/sys/get?docid=93"
    xap:id="_9"/></xap:subelement>
</xap:constraint>
<xap:constraint xap:id="_10">
<xap:subelement xap:id="_11"><xap:elementRef
    xap:href="/xap/sys/get?docid=94"
    xap:id="_12"/></xap:subelement>
</xap:constraint>
<xap:constraint xap:id="_13">
<xap:subelement xap:id="_14"><xap:elementRef
    xap:href="/xap/sys/get?docid=95"
    xap:id="_15"/></xap:subelement>
</xap:constraint>
</xap:state>
```

The above XML description provides a variety of information similar in nature to that set forth in the previous element and type constructs. Of further interest, the "xap:constraint" tag is used four times to specify constraints for data objects when in the state specified by the BA construct. In particular, four "xap:subelement" constraints are defined, describing children nodes that are to exist when the data object is in the state specified by the BA construct. The children nodes are described by references to yet other element constructs, thereby establishing "Subelement of" relationships between the BA state construct and each of the other element constructs.

The required child nodes of data objects that conform to the Address metadata item, while in the default type and state, may be described by the following XML representations:

```
<xap:element xmlns:xap="http://xap.oracle.com" xap:docid="92"
    xap:id="_0">
<xap:name xap:id="_1">addressline</xap:name>
<xap:uri xap:id="_2">http://xap.oracle.com/demo</xap:uri>
<xap:label xap:id="_3">AddressLine</xap:label>
<xap:datatypeRef xap:href="/xap/sys/get?docid=82" xap:id="_4"/>
<xap:description xap:id="_5">The address line.</xap:description>
</xap:element>
<xap:element xmlns:xap="http://xap.oracle.com" xap:docid="93"
    xap:id="_0">
<xap:name xap:id="_1">city</xap:name>
<xap:uri xap:id="_2">http://xap.oracle.com/demo</xap:uri>
<xap:label xap:id="_3">City</xap:label>
<xap:datatypeRef xap:href="/xap/sys/get?docid=82" xap:id="_4"/>
<xap:description xap:id="_5">The city name in
    address.</xap:description>
```

-continued

```
    </xap:element>
    <xap:element xmlns:xap="http://xap.oracle.com" xap:docid="94"
            xap:id="_0">
        <xap:name xap:id="_1">state</xap:name>
        <xap:uri xap:id="_2">http://xap.oracle.com/demo</xap:uri>
        <xap:label xap:id="_3">State</xap:label>
        <xap:datatypeRef xap:href="/xap/sys/get?docid=82" xap:id="_4"/>
        <xap:description xap:id="_5">The state name in
                address.</xap:description>
    </xap:element>
    <xap:element xmlns:xap="http://xap.oracle.com" xap:docid="95"
            xap:id="_0">
        <xap:name xap:id="_1">zipcode</xap:name>
        <xap:uri xap:id="_2">http://xap.oracle.com/demo</xap:uri>
        <xap:label xap:id="_3">Zipcode</xap:label>
        <xap:datatypeRef xap:href="/xap/sys/get?docid=82" xap:id="_4"/>
        <xap:description xap:id="_5">The zip code in
                address.</xap:description>
    </xap:element>
```

The above XML sets forth definitions for the metadata items "AddressLine Element," "City Element," "State Element," and "Zipcode Element," corresponding to nodes 515-518 of graph 500. These elements are scalar data type elements, subject to the constraints imposed by yet another metadata item, having the XAP identifier of 62, which is not described herein, but corresponds to simple strings.

An XML representation of a single data object that conforms to the constraints set forth by the above metadata items is as follows:

```
<?xml version="1.0" encoding="UTF-8"?>
<demo:address xmlns:demo="http://xap.oracle.com/demo"
                xmlns:xap="http://xap.oracle.com" xap:docid="E6"
                xap:id="_0" xap:states="174">
    <demo:address xap:id="_8" xap:states="172">
        <demo:addressline xap:id="_9">123 Main St.</demo:addressline>
        <demo:city xap:id="_10">Redwood Shores</demo:city>
        <demo:state xap:id="_11">CA</demo:state>
        <demo:zipcode xap:id="_12">94065</demo:zipcode>
    </demo:address>
```

A normalized version of such a data object is graphed in FIG. 4, beginning at node 426. An XML parser would recognize that the above data object is to conform to the above metadata using the reference to the namespace set forth by the "xmlns:demo" attribute of "demo:address" and the reference to specific element construct definitions set forth by each tag's name.

In an embodiment, some or all of the information in the above XML definitions of metadata items may be subject to a indexing, per the techniques described herein. In an embodiment, only "description," "name," and "label" may be indexed. In an embodiment, a search is only performed on element constructs, and thus only element constructs are indexed. Relationships between element constructs, such as "Child of," "Descendent of," and "Parent of" may be derived from following references from one element construct to another element construct. However, metatdata searching need not be limited to any particular type of construct or any particular type of relationship.

The above example is but one way that data and metadata may be represented. A variety of other representations are also possible, including other XML-based representations. Other kinds of relationships and constraints may also be defined using any suitable technique.

5.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
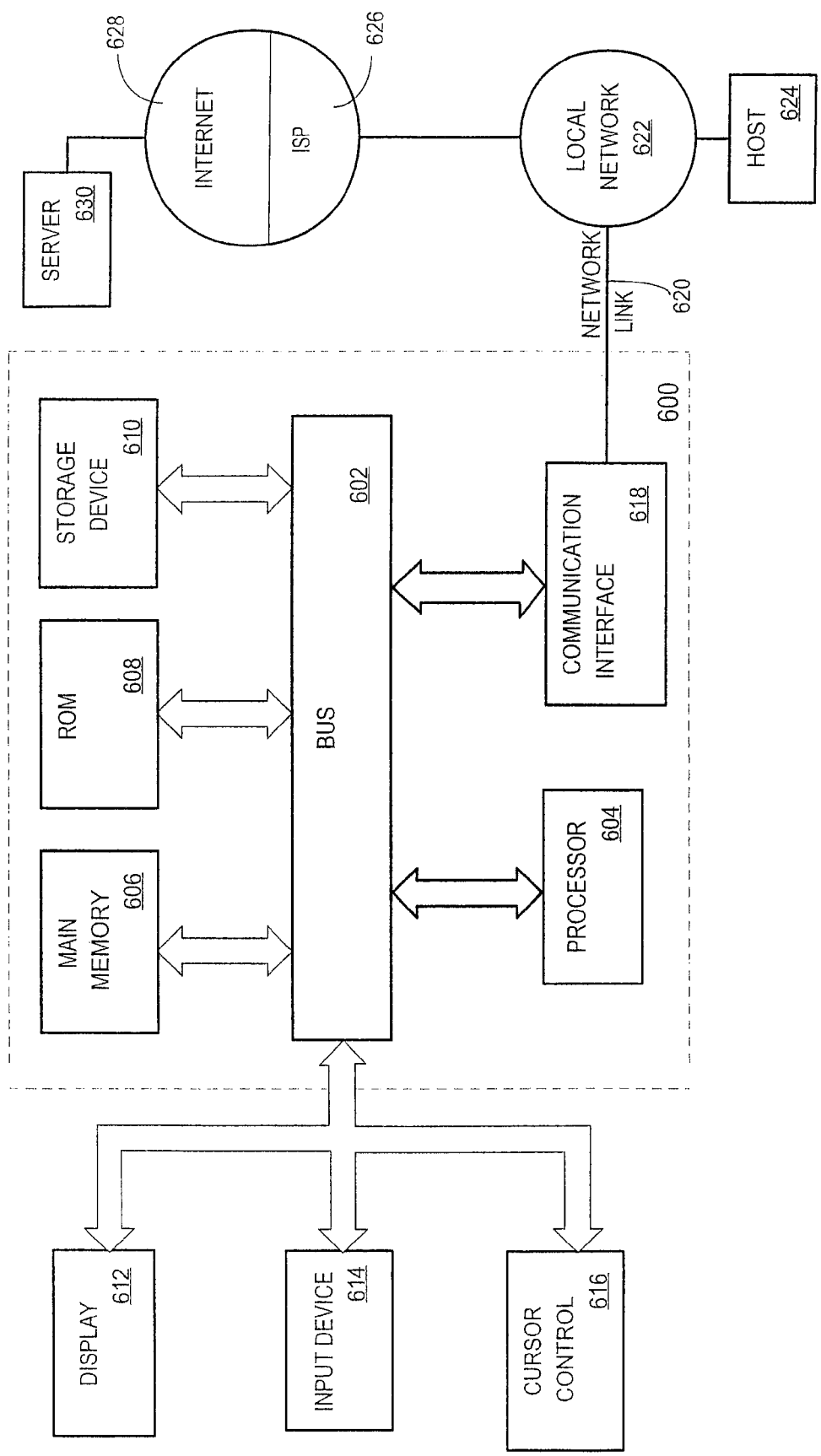
FIG. 6 is block diagram of a computer system upon which embodiments of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

6.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   maintaining relationship data describing relationships between data objects in a collection of data objects;
   identifying search results for a set of query terms, each result of the search results being a subset of related data objects within the collection, the subset comprising, for each particular term of the set of query terms, at least one data object that matches the particular term;
   wherein identifying the search results comprises:
      identifying groups of initial data objects to investigate for the search results, the groups including at least a first group matching a first query term, a second group matching a second query term, and a third group matching a third query term;
      based on how often certain initial data objects appear both in the first group and the second group, removing, from the groups, initial data objects that are not found within both the first group and the second group;
      identifying particular subsets of related data objects within the collection by, based on the relationships, expanding networks of related data objects from remaining initial data objects;
      determining which of the particular subsets qualify as the search results.

2. The method of claim 1, wherein the data objects are rows within a plurality of database tables, wherein the search results comprise a first search results that is a first set of related rows and a second search result that is a second set of related rows, wherein the column fields for which the first set of related rows have values are different than the column fields for which the second set of related rows have values.

3. The method of claim 1, wherein the data objects are extended markup language objects, wherein the search results comprises a first search result that is a first XML object and a second search result that is a second XML object, wherein the first XML object and the second XML object conform to different schemas.

4. The method of claim 1, further comprising identifying particular subsets of related data objects and determining which of the particular subsets qualify as the search results by:
 populating a candidate set of data objects from the remaining initial data objects;
 identifying a particular data object within the candidate set to investigate;
 determining whether the particular data object is a search result by determining whether the particular data object is or comprises a subset of related data objects such that, for each particular term of the query terms, at least one data object that matches the particular term;
 when the particular data object is not a search result, identifying one or more new data objects to investigate by adding, to the candidate set, one or more ancestor objects that are related to the particular data object;
 iteratively repeating the identifying a particular data object to investigate, determining whether the particular data object is a search result, and identifying one or more new data objects to investigate, with respect to different data objects within the candidate set, until the search results have been identified.

5. The method of claim 1, further comprising expanding networks of related data objects in an order that is based on one or more scores assigned to each of at least the remaining initial data objects, the one or more scores for a particular data objects comprising one or more of:
 a relationship score calculated from a link analysis of the collection;
 a metadata score for a particular metadata item to which the particular data object conforms, the metadata score calculated from a link analysis of different metadata items to which the data items in the collection conforms.

6. The method of claim 1, wherein removing, from the groups, initial data objects that are not found within both the first group and the second group is responsive to determining that data objects within the first group also appear above a threshold frequency within the second group, the method further comprising:
 determining that data objects within the first group do not also appear above a threshold frequency in the third group, wherein initial data objects that belong to the third group but not the first group remain in the groups of initial data objects.

7. A method comprising:
 performing a link analysis of related metadata items to which a collection of related data objects conform;
 calculating metadata scores for the related metadata items based upon the link analysis;
 identifying search results for a set of query terms, each result of the search results being a subset of related data objects within the collection, the subset comprising, for each particular term of the set of query terms, at least one data object that matches the particular term;
 wherein identifying the search results comprises:
  identifying groups of initial data objects to investigate for the search results, the groups including at least a first group matching a first query term and a second group matching a second query term;
  identifying particular subsets of related data objects within the collection by, in an order at least partially based on the metadata scores, expanding networks of the related data objects from the initial data objects;
  determining which of the particular subsets qualify as the search results.

8. The method of claim 7, further comprising:
 performing a link analysis of the collection of the related data objects;
 calculating relationship scores for the related data objects based upon the link analysis;
 wherein the order is further based at least partially upon the relationship scores.

9. The method of claim 7, wherein the data objects are rows within a plurality of database tables, wherein the search results comprise a first search results that is first set of related rows and a second search result that is a second set of related rows, wherein the column fields for which the first set of related rows have values are different than the column fields for which the second set of related rows have values.

10. The method of claim 7, wherein the data objects are extended markup language objects, wherein the search results comprises a first search result that is a first XML object and a second search result that is a second XML object, wherein the first XML object and the second XML object conform to different schemas.

11. The method of claim 7, further comprising identifying particular subsets of related data objects and determining which of the particular subsets qualify as the search results by:
 populating a candidate set of data objects from the initial data objects;
 ordering at least the data objects in the candidate set, the ordering comprising, for each particular data object in the candidate set, identifying a priority score based at least partially upon a particular metadata score that has been assigned to a particular metadata item to which the particular data object conforms;
 based on the ordering, identifying a first data object within the candidate set to investigate;
 determining whether the first data object is a search result by determining whether the first data object is or comprises a subset of related data objects such that, for each particular term of the query terms, at least one data object that matches the particular term;
 when the first data object is not a search result, identifying one or more new data objects to investigate by adding, to the candidate set, one or more ancestor objects that are related to the first data object;
 iteratively repeating at least the identifying a first data object to investigate, determining whether the first data object is a search result, and identifying one or more new data objects to investigate, with respect to different data objects within the candidate set, until the search results have been identified.

12. The method of claim 7, further comprising terminating identifying the search results upon one or more of:
 comparing a count of the identified search results with a maximum result set size; or
 determining that all search results of a maximum relationship depth have been identified;
 wherein terminating identifying the search results occurs prior to investigating each of the related data objects within the collection.

13. One or more non-transitory computer-readable media storing instructions that, when executed by one or more computing devices, cause:

maintaining relationship data describing relationships between data objects in a collection of data objects;

identifying search results for a set of query terms, each result of the search results being a subset of related data objects within the collection, the subset comprising, for each particular term of the query terms, at least one data object that matches the particular term;

wherein identifying the search results comprises:
identifying groups of initial data objects to investigate for the search results, the groups including at least a first group matching a first query term, a second group matching a second query term, and a third group matching a third query term;
based on how often certain initial data objects appear both in the first group and the second group, removing, from the groups, initial data objects that are not found within both the first group and the second group;
identifying particular subsets of related data objects within the collection by, based on the relationships, expanding networks of related data objects from the remaining initial data objects;
determining which of the particular subsets qualify as the search results.

14. The one or more non-transitory computer-readable media of claim 13, wherein the data objects are rows within a plurality of database tables, wherein the search results comprise a first search results that is a first set of related rows and a second search result that is a second set of related rows, wherein the column fields for which the first set of related rows have values are different than the column fields for which the second set of related rows have values.

15. The one or more non-transitory computer-readable media of claim 13, wherein the data objects are extended markup language objects, wherein the search results comprises a first search result that is a first XML object and a second search result that is a second XML object, wherein the first XML object and the second XML object conform to different schemas.

16. The one or more non-transitory computer-readable media of claim 13, wherein the instructions, when executed by the one or more computing devices, further cause identifying particular subsets of related data objects and determining which of the particular subsets qualify as the search results by:
populating a candidate set of data objects from the remaining initial data objects;
identifying a particular data object within the candidate set to investigate;
determining whether the particular data object is a search result by determining whether the particular data object is or comprises a subset of related data objects such that, for each particular term of the query terms, at least one data object that matches the particular term;
when the particular data object is not a search result, identifying one or more new data objects to investigate by adding, to the candidate set, one or more ancestor objects that are related to the particular data object;
iteratively repeating the identifying a particular data object to investigate, determining whether the particular data object is a search result, and identifying one or more new data objects to investigate, with respect to different data objects within the candidate set, until the search results have been identified.

17. The one or more non-transitory computer-readable media of claim 13, wherein the instructions, when executed by the one or more computing devices, further cause expanding networks of related data objects in an order that is based on one or more scores assigned to each of at least the remaining initial data objects, the one or more scores for a particular data objects comprising one or more of:
a relationship score calculated from a link analysis of the collection;
a metadata score for a particular metadata item to which the particular data object conforms, the metadata score calculated from a link analysis of different metadata items to which the data items in the collection conforms.

18. The one or more non-transitory computer-readable media of claim 13, wherein removing, from the groups, initial data objects that are not found within both the first group and the second group is responsive to determining that data objects within the first group also appear above a threshold frequency within the second group, the method further comprising:
determining that data objects within the first group do not also appear above a threshold frequency in the third group, wherein initial data objects that belong to the third group but not the first group remain in the groups of initial data objects.

19. One or more non-transitory computer-readable media storing instructions that, when executed by one or more computing devices, cause performance of:
performing a link analysis of related metadata items to which a collection of related data objects conform;
calculating metadata scores for the related metadata items based upon the link analysis;
identifying search results for a set of query terms, each result of the search results being a subset of related data objects within the collection, the subset comprising, for each particular term of the set of query terms, at least one data object that matches the particular term;
wherein identifying the search results comprises:
identifying groups of initial data objects to investigate for the search results, the groups including at least a first group matching a first query term and a second group matching a second query term;
identifying particular subsets of related data objects within the collection by, in an order at least partially based on the metadata scores, expanding networks of the related data objects from the initial data objects;
determining which of the particular subsets qualify as the search results.

20. The one or more non-transitory computer-readable media of claim 19, wherein the instructions, when executed by the one or more computing devices, further cause:
performing a link analysis of the collection of the related data objects;
calculating relationship scores for the related data objects based upon the link analysis;
wherein the order is further based at least partially upon the relationship scores.

21. The one or more non-transitory computer-readable media of claim 19, wherein the data objects are rows within a plurality of database tables, wherein the search results comprise a first search results that is first set of related rows and a second search result that is a second set of related rows, wherein the column fields for which the first set of related rows have values are different than the column fields for which the second set of related rows have values.

22. The one or more non-transitory computer-readable media of claim 19, wherein the data objects are extended markup language objects, wherein the search results comprises a first search result that is a first XML object and a second search result that is a second XML object, wherein the first XML object and the second XML object conform to different schemas.

23. The one or more non-transitory computer-readable media of claim 19, wherein the instructions, when executed by the one or more computing devices, further cause identifying particular subsets of related data objects and determining which of the particular subsets qualify as the search results by:
- populating a candidate set of data objects from the initial data objects;
- ordering at least the data objects in the candidate set, the ordering comprising, for each particular data object in the candidate set, identifying a priority score based at least partially upon a particular metadata score that has been assigned to a particular metadata item to which the particular data object conforms;
- based on the ordering, identifying a first data object within the candidate set to investigate;
- determining whether the first data object is a search result by determining whether the first data object is or comprises a subset of related data objects such that, for each particular term of the query terms, at least one data object that matches the particular term;
- when the first data object is not a search result, identifying one or more new data objects to investigate by adding, to the candidate set, one or more ancestor objects that are related to the first data object;
- iteratively repeating at least the identifying a first data object to investigate, determining whether the first data object is a search result, and identifying one or more new data objects to investigate, with respect to different data objects within the candidate set, until the search results have been identified.

24. The one or more non-transitory computer-readable media of claim 19, wherein the instructions, when executed by the one or more computing devices, further cause terminating identifying the search results upon one or more of:
- comparing a count of the identified search results with a maximum result set size; or
- determining that all search results of a maximum relationship depth have been identified;
- wherein terminating identifying the search results occurs prior to investigating each of the related data objects within the collection.

* * * * *

UNITED STATES PATENT AND TRADEMARK OFFICE
CERTIFICATE OF CORRECTION

Page 1 of 1

PATENT NO.        : 9,171,065 B2
APPLICATION NO.   : 14/222521
DATED             : October 27, 2015
INVENTOR(S)       : Raghavan et al.

It is certified that error appears in the above-identified patent and that said Letters Patent is hereby corrected as shown below:

In the Specification

In column 11, line 57, delete "objects's" and insert -- object's --, therefor.

In column 20, line 59, delete "subgraphs" and insert -- subgraphs. --, therefor.

In column 22, line 24, delete "the are" and insert -- they are --, therefor.

In column 26, line 11, delete "the the" and insert -- the --, therefor.

In column 27, line 60, delete "metatdata" and insert -- metadata --, therefor.

Signed and Sealed this
Twenty-eighth Day of June, 2016

Michelle K. Lee
*Director of the United States Patent and Trademark Office*